(12) United States Patent
Naveh et al.

(10) Patent No.: US 12,530,081 B2
(45) Date of Patent: Jan. 20, 2026

(54) SELECTING A QUANTUM COMPUTER

(71) Applicant: Classiq Technologies LTD, Tel Aviv (IL)

(72) Inventors: Amir Naveh, Haifa (IL); Shmuel Ur, Shorashim (IL); Eyal Cornfeld, Ramat Gan (IL); Ofek Kirzner, Haifa (IL); Nir Minerbi, Haifa (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 777 days.

(21) Appl. No.: 17/938,347

(22) Filed: Oct. 6, 2022

(65) Prior Publication Data

US 2023/0023333 A1    Jan. 26, 2023

(51) Int. Cl.
*G06F 3/01* (2006.01)
*G06N 10/20* (2022.01)
*G06N 10/80* (2022.01)
*G08B 6/00* (2006.01)

(52) U.S. Cl.
CPC ............ *G06F 3/016* (2013.01); *G06N 10/20* (2022.01); *G06N 10/80* (2022.01); *G08B 6/00* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 2019/0164076 A1* | 5/2019 | Kim | G06N 10/80 |
| 2023/0040849 A1* | 2/2023 | Shanmugam Sakthivadivel | G06N 10/80 |
| 2023/0111039 A1* | 4/2023 | Naveh | G06F 8/41 716/100 |

* cited by examiner

*Primary Examiner* — Craig C Dorais

(57) ABSTRACT

A method, apparatus, and product comprising: obtaining an indication of an execution task, the execution task comprises executing a quantum program a number of times, the number of times is larger than two times; and selecting a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer.

20 Claims, 8 Drawing Sheets

SELECTING A QUANTUM COMPUTER

TECHNICAL FIELD

The present disclosure relates to quantum computing in general, and to selecting a cloud quantum computer for performing an execution task, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits.

Quantum programs may be executed using one or more quantum computers or simulated using a quantum simulator, a classic computer simulator, or the like. A quantum cloud may offer quantum computing resources through one or more platforms.

BRIEF SUMMARY

One exemplary embodiment of the disclosed subject matter is a method comprising: obtaining an indication of an execution task, the execution task comprises executing a quantum program a number of times, the number of times is larger than two times; and selecting a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises: compiling the quantum program or a portion thereof to a first executable quantum circuit, the first executable quantum circuit complying with hardware constraints of the first quantum computer; based on the first executable quantum circuit, estimating the first value of the performance parameter that is associated with the first quantum computer, wherein said estimating is performed statically without executing the first executable quantum circuit; compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof, and based on said the second executable quantum circuit, estimating the second value of the performance parameter that is associated with the second quantum computer, wherein said estimating is performed statically without executing the second executable quantum circuit.

Optionally, said selecting the quantum computer is further performed based on a dynamic analysis of the set of two or more quantum computers, wherein the dynamic analysis comprises: performing, by the first quantum computer, an execution of the first executable quantum circuit for a second number of times; based on said performing the execution of the first executable quantum circuit for the second number of times, estimating the first value of the performance parameter; performing, by the second quantum computer, an execution of the second executable quantum circuit for a third number of times, wherein a summation of the second number of times and of the third number of times is lesser than the number of times; and based on said performing the execution of the second executable quantum circuit, estimating the second value of the performance parameter.

Optionally, said selecting the quantum computer for performing the execution task comprising: using a static analysis for measuring first and second value ranges of the performance parameter; using a cost function to determine first and second cost ranges corresponding to the first and second value ranges of the performance parameter; determining that a comparison of the first and second cost ranges results with an indefinite outcome; and in response to said determining that the comparison of the first and second cost ranges results with the indefinite outcome, performing a dynamic analysis for obtaining a definite outcome to the comparison, wherein the dynamic analysis comprises performing: said performing the execution of the first executable quantum circuit for the second number of times, and said performing the execution of the second executable quantum circuit for the third number of times, wherein the first and second values of the performance parameter are first and second discrete values of the performance parameter, whereby based on the dynamic analysis a definite outcome to a comparison between the first and second quantum computers is obtainable.

Optionally, the set of two or more quantum computers comprises a third quantum computer, said selecting the quantum computer is based on a third value of the performance parameter that is associated with the third quantum computer, and a static analysis is configured to estimate the third value without compiling of the quantum program or the portion thereof to a third executable quantum circuit complying with hardware constraints of the third quantum computer.

Optionally, said compiling the quantum program to the first executable quantum circuit comprises: obtaining a minor program that shares one or more attributes with the quantum program, wherein the minor program is estimated to utilize less quantum resources, when executed on the quantum computer, than the quantum program; and compiling the minor program to obtain the first executable quantum circuit.

Optionally, obtaining the minor program comprises obtaining a sample program configured to provide a subset of functionalities defined by the quantum program.

Optionally, the hardware constraints of the first quantum computer comprise at least one constraint of a type of: a constraint on a number of qubits; a constraint on a number of gates of one or more types; a constraint on a number of cycles; a constraint on a ratio between the number of qubits and the number of cycles.

Optionally, the hardware constraints of the first quantum computer include a constraint of a first type, wherein the hardware constraints of the second quantum computer exclude the constraint of the first type.

Optionally, the method further comprises obtaining an indication of the hardware constraints of the first and second quantum computers.

Optionally, the set of two or more quantum computers comprises a third quantum computer, wherein said selecting the quantum computer from the set of two or more quantum computers comprises: detecting that the third quantum computer has resources which are not compliant with required resources of the execution task; and avoiding selecting the third quantum computer, whereby avoiding compiling and executing the quantum program or the portion thereof with respect to the third quantum computer.

Optionally, said selecting the quantum computer comprises: computing a first score for the first quantum computer based on an objective function and based on the first value of the performance parameter; computing a second score for the second quantum computer based on the objective function and based on the second value of the performance parameter; and whereby selection of the quantum computer is based on the first and second scores.

Optionally, said selecting the quantum computer is performed based on a first value of a second performance parameter that is associated with the first quantum computer and based on a second value of the second performance parameter that is associated with the second quantum computer, wherein the objective function provides respective weights for the performance parameter and for the second performance parameter.

Optionally, the method comprises completing the execution task using the quantum computer, said completing comprises: performing, by the quantum computer, a fourth number of times an execution of the quantum program, wherein the fourth number of times is equal to: $N_1-(N_2+N_3)$, wherein $N_1$ is the first number of times, $N_2$ is the second number of times and N; is the third number of times, whereby implementing the execution task while utilizing executions that were performed as part of said selecting.

Optionally, the first value of the performance parameter indicated a first packing capability of the execution task at the first quantum computer, and the second value of the performance parameter indicated a second packing capability of the execution task at the second quantum computer.

Optionally, the performance parameter comprises: a compliance parameter; a parallel execution parameter, a connectivity parameter; an execution-effectiveness parameter; an execution-time parameter; an error-rate parameter; an entanglement parameter, or the like.

Optionally, the execution task further comprises executing a second quantum program for a fourth number of times.

Another exemplary embodiment of the disclosed subject matter is an apparatus comprising a processor and coupled memory, said processor being adapted to: obtain an indication of an execution task, the execution task comprises executing a quantum program a number of times, the number of times is larger than two times; and select a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises: compiling the quantum program or a portion thereof to a first executable quantum circuit, the first executable quantum circuit complying with hardware constraints of the first quantum computer; based on the first executable quantum circuit, estimating the first value of the performance parameter that is associated with the first quantum computer, wherein said estimating is performed statically without executing the first executable quantum circuit; compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and based on said the second executable quantum circuit, estimating the second value of the performance parameter that is associated with the second quantum computer, wherein said estimating is performed statically without executing the second executable quantum circuit.

Yet another exemplary embodiment of the disclosed subject matter is a computer program product comprising a non-transitory computer readable medium retaining program instructions, which program instructions when read by a processor, cause the processor to: obtain an indication of an execution task, the execution task comprises executing a quantum program a number of times, the number of times is larger than two times; and select a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises: compiling the quantum program or a portion thereof to a first executable quantum circuit, the first executable quantum circuit complying with hardware constraints of the first quantum computer; based on the first executable quantum circuit, estimating the first value of the performance parameter that is associated with the first quantum computer, wherein said estimating is performed statically without executing the first executable quantum circuit; compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and based on said the second executable quantum circuit, estimating the second value of the performance parameter that is associated with the second quantum computer, wherein said estimating is performed statically without executing the second executable quantum circuit.

Yet another exemplary embodiment of the disclosed subject matter is a system comprising a processor and coupled memory, said processor being adapted to: obtain an indication of an execution task, the execution task comprises executing a quantum program a number of times, the number of times is larger than two times; and select a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises: compiling the quantum program or a portion thereof to a first executable quantum circuit, the first executable quantum circuit complying with hardware constraints of the first quantum computer; based on the first executable quantum circuit, estimating the first value of the performance parameter that is associated with the first quantum computer, wherein said estimating is performed statically without executing the first executable quantum circuit; compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and based on said the second executable quantum circuit, estimating the second value of the performance parameter that is associated with the second quantum computer, wherein said estimating is performed statically without executing the second executable quantum circuit.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
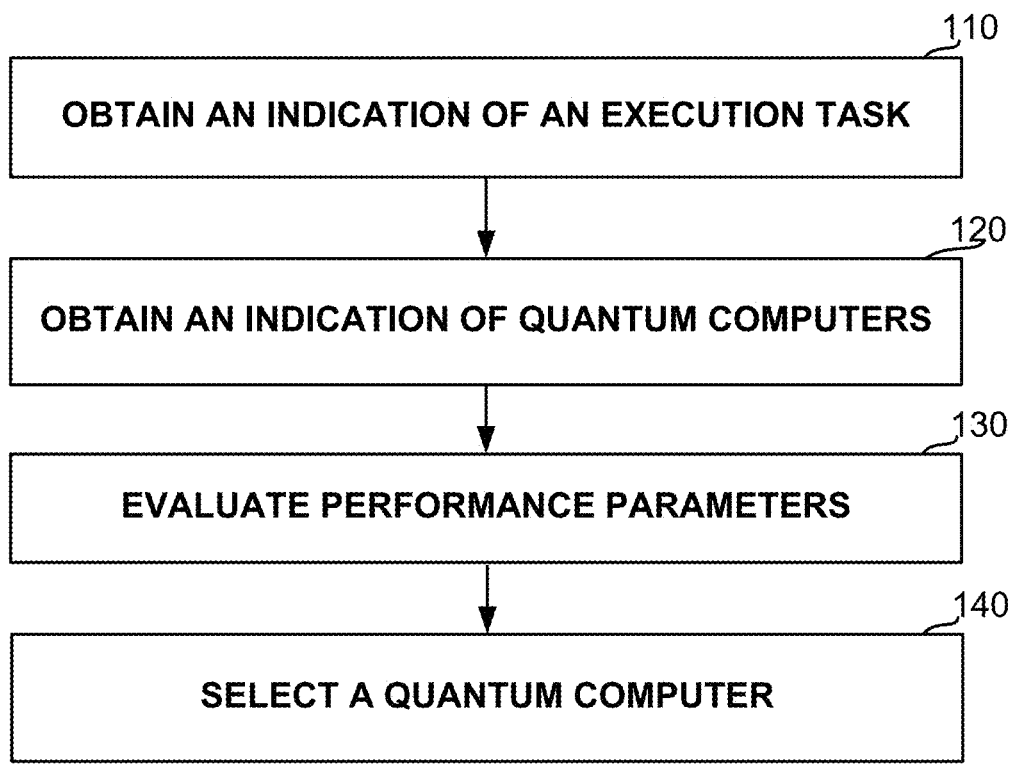
FIG. 1 shows an exemplary flowchart diagram of a method, in accordance with some exemplary embodiments of the disclosed subject matter.

One technical problem dealt with by the disclosed subject matter is selecting one or more execution platforms of one or more clouds, for performing an execution task. In some exemplary embodiments, a quantum cloud may enable developers or other clients to run their algorithms on a variety of hardware platforms and simulators. For example, a developer may invoke one or more quantum computers, platforms, emulators, simulators, or the like, via a quantum cloud. In some cases, several cloud providers may or may not be used. It is noted that the term 'cloud', as used herein, may refer to multiple clouds or to a single cloud.

In some cases, utilizing different quantum computers of a cloud for executing a quantum program may yield different results. For example, different quantum computers may have different hardware properties, which may affect a compilation of a program, an error rate of the program, the execution time of the program, or the like. Selecting a quantum computer for executing a program via one or more quantum clouds may influence an outcome of executions, making this a major decision. In some exemplary embodiments, it may be desired to simplify the usage of quantum clouds, such as by providing a simple and user friendly manner of identifying and using the most effective quantum computers of a cloud (referred to herein as 'cloud computers') for an execution task.

Another technical problem dealt with by the disclosed subject matter is selecting one or more quantum computers for performing an execution task. In some exemplary embodiments, a quantum computer may or may not comprise a quantum cloud. It is noted that the term 'cloud computer', as used hereinafter, may refer to a cloud computer or to a quantum computer that is not available via a cloud. It may be desired to enable a user to make an informed decision regarding a selection of a quantum computer for executing the execution task.

Yet another technical problem dealt with by the disclosed subject matter is selecting a cloud computer according to a personalized objective function, tradeoff, or the like. In some cases, a user may have a preferred ratio between performance parameters of an execution task, which may be affected by a selection of an execution platform of a cloud. In some cases, a tradeoff may exist between performance parameters of executing an execution task at different execution platforms. For example, a first quantum computer may enable to execute a program using fifty qubits over ten cycles, while a second quantum computer may enable to execute a different implementation of the same program using ten qubits over fifty cycles. According to this example, the first computer may provide a reduced execution time, while the second program may provide a reduced resource utilization of qubits. In order to select an optimal execution platform, it may be necessary to determine a common scheme for assessing quantum processing providers, in accordance with the specific needs of the client, user, or the like. In some exemplary embodiments, such a scheme may be based on a determined ratio between performance parameters, weights of performance parameters, or the like. For example, in case a user desires to minimize the execution time regardless of the resulting error rate, it may be desired to detect a quantum computer that is estimated to execute the execution task for a smallest duration, with respect to the remaining quantum computers of a cloud.

One technical solution provided by the disclosed subject matter comprises selecting one or more quantum computers for executing an execution task, based on a filtering scheme. In some exemplary embodiments, an execution task may comprise a task of executing one or more instances of one or more programs, and may be defined by a user, obtained from a remote server, or the like. For example, an execution task may comprise two or more instances of a first program, one instance of a second program, ten instances of a third program, or the like.

In some exemplary embodiments, a representation of a program of an execution task may comprise specified high-level program functions (e.g., without necessarily referring to a qubit set, a gate set, or the like), an Intermediate Representation (IR) of the program, low-level components such as gates, or the like. In some exemplary embodiments, program representations may correspond to representations disclosed in U.S. application Ser. No. 17/450,583, titled "Functional-Level Processing Component for Quantum Computers", filed Oct. 12, 2021, which is hereby incorporated by reference in its entirety for all purposes without giving rise to disavowment.

In some exemplary embodiments, a filtering scheme may utilize one or more parameters (e.g., performance parameters) to select one or more cloud computers for executing an execution task. In some cases, performance parameters with respect to an execution task and a cloud computer may not be easy to determine and measure. It may not be sufficient to measure properties of cloud computers alone, since different tasks may match different hardware properties. In some exemplary embodiments, in order to select a cloud computer for an execution task, the filtering scheme may be used to filter out cloud computers from a list of available cloud computers in case they are estimated to be irrelevant or suboptimal for the execution task. For example, two or more available cloud computers may be added to a list of candidate cloud computers, and the list may be filtered based on one or more performance parameters. In case only one cloud computer is available, the cloud computer may be utilized for performing the execution task. It is noted that the list of candidate computers may retain non-cloud quantum computers, cloud computers from a same cloud, cloud computers from different clouds, or the like.

In some exemplary embodiments, the filtering scheme may be configured to filter out cloud computers based on an estimation of a performance of the cloud computers with respect to a specific execution task, an associated cost, or the like. For example, a cloud computer may be selected for performing a first execution task, based on a determination that the cloud computer optimizes one or more performance parameters (or associated costs) for the first execution task, while the cloud computer may not be selected to perform a second execution task with different properties, based on a determination that the cloud computer does not optimize one or more performance parameters (or associated costs) for the second execution task due to the properties of the second execution task. For example, a qubit connectivity of the cloud computer may optimize an execution time of the first execution task, while adversely affecting the execution time of the second execution task.

In some exemplary embodiments, the performance parameters may be determined, calculated, obtained, or the like, with respect to a paired execution task and cloud computer, referred to as an 'execution pair'. In some cases, a cloud computer that is paired with a portion of an execution task (e.g., a single program thereof) and a cloud computer may also be referred to as an 'execution pair'. For example, in order to select a cloud computer for executing an execution task, performance parameters may be selected and evaluated for multiple execution pairs, each of which pairing an execution task or portion thereof, with a different cloud computer.

In some exemplary embodiments, values of performance parameters may be measured or estimated based on a static and/or dynamic analysis of the execution pairs, an execution environment of the cloud computer, or the like. In some exemplary embodiments, a static analysis of a program of the execution task may be performed without executing or simulating the program, while a dynamic analysis may be performed by executing or simulating the program, a portion thereof, a sample thereof, or the like, on two or more inspected cloud computers. For example, a static analysis may be performed according to one or more methods that are disclosed in U.S. patent application Ser. No. 17/929,703 filed Sep. 4, 2022, titled 'Performance Analysis Of Quantum Programs', which is hereby incorporated by reference in its entirety. In some exemplary embodiments, performance parameters of execution pairs may be evaluated, costs thereof may be estimated, and a comparison may be made between the performances and/or costs of the different cloud computers, which may or may not be weighted costs, based on which one cloud computer may be selected for the execution task.

In some exemplary embodiments, one or more performance parameters may be selected, determined, obtained, or the like, for evaluating the performance of a program on different platforms. For example, a list of multiple performance parameters may be retained, and a subset thereof that is estimated to be useful for comparing certain execution pairs, may be utilized to compare performance parameters and/or costs of the execution pairs. As an example, in case an objective function provided by a user indicates that only error rates are important to the user, any performance parameters that are not associated to error rates may not be evaluated. In some exemplary embodiments, one or more platform-independent properties of the execution task may be determined and used to select relevant performance parameters. In some exemplary embodiments, the properties of an execution task may be, in some cases, platform-independent, as they may comprise basic properties of the included programs, in its uncompiled form, that are relevant for any execution platform. For example, in case a program utilizes only one-qubit gates, a connectivity parameter that is associated to a connectivity of qubits in quantum computers may be irrelevant to the program (e.g., since the program may not require qubits to be connected to a same gate), regardless of properties of an execution platform, and in such cases performance parameters associated with a connectivity of a platform may not be utilized, selected, or the like.

In some exemplary embodiments, after selecting or obtaining a selection of performance parameters, the selected performance parameters may be evaluated for each execution pair. For example, performance parameters may be evaluated using a static analysis that is configured to analyze the execution pair without executing or simulating the execution task, using a dynamic analysis that is configured to analyze the execution pair by executing or simulating portions of the execution task, a combination thereof, or the like. As an example, as part of a static analysis, attributes of programs such as a circuit depth (e.g., a number of cycles), a gate count, or the like, may be detected or estimated, and utilized to evaluate performance parameters such as an approximated execution time of the program at a target computer. In some exemplary embodiments, an estimation of one or more values of a performance parameter may be made, such as by estimating (e.g. as part of a static analysis) an execution time of the execution pair based on an estimated number of cycles and qubits of the program and a number of available qubits at the cloud computer. For example, a static analysis may analyze a compiled version of a program, that is compiled by a hardware compiler of a quantum computer, in order to estimate attributes such as the execution time of the program with respect to the quantum computer. It is noted, in this regard, that in contrast to classical computing, quantum computing enables to efficiently analyze properties of compiled quantum circuits, such as estimating an execution time thereof, at least since quantum circuits may not have loops (conditioned loops, unconditioned loops, or the like) that complicate such calculations. As another example, as part of a dynamic analysis, a program may be compiled and simulated using a classical computer, and simulation properties thereof may be inspected to measure an execution time of the program, an amount of memory that was used by the simulated program, a number of basic instructions (e.g., add, multiply) that were included in the simulated program, or the like.

In some exemplary embodiments, although some performance parameters may be measurable using a static analysis, in many cases, a dynamic analysis may provide for more accurate or resource conserving measurements. For example, some properties, such as the amount of memory that is used by the program, may be difficult to evaluate in a static analysis, but may be determined relatively easily using a dynamic analysis. As another example, a static analysis may be performed, by default, at an initial phase, and in case results of the static analysis are insufficient, a dynamic analysis may be performed with respect to one or more performance parameters. In some exemplary embodiments, a static analysis of an execution task may not always be possible, and may in some cases provide low accuracy evaluations of performance parameters.

In some exemplary embodiments, a dynamic analysis may be utilized to enhance the evaluations of the performance parameters. In some exemplary embodiments, during a dynamic analysis, a program may be executed for a small number of time (e.g., less than a threshold) on different cloud computers, and properties of the executions may be measured, sampled, or the like, and used to evaluate parameter values. In some exemplary embodiments, the program may be executed a limited number of times, such as in order to save computational resources, time resources, or the like, while enhancing an accuracy of the performance parameters, thereby enabling to select an advantageous cloud computer for the execution task.

In some exemplary embodiments, performance parameters may be measured based on a static analysis, a dynamic analysis, or the like. In some exemplary embodiments, some performance parameters may be measurable via a dynamic analysis only, a static analysis only, or the like. In some cases, for each performance parameter that is determined to be measured, a decision may be made indicating whether a dynamic and/or static analysis should be used, whether a program should be compiled or not (and if it should—for which platforms it should be compiled), or the like. For example, a static analysis may be applied in case it is estimated to result with a high accuracy measurement of the performance parameter. The decision may be based on heuristics, a statistical analysis of historic measurements, machine learning predictors, estimating costs for each analysis, estimated resource utilizations of each analysis, or the like. For example a machine learning predictor may be trained on a dataset including programs and respective accuracy levels of parameter measurements using a static analysis. According to this example, the predictor may be used to estimate an accuracy level that can be obtained from the static analysis, and in case it is low (e.g., below a threshold), a dynamic analysis may be performed instead and/or in addition thereto. For example, the predictor may predict that a first performance parameter of a program should be evaluated using a static analysis and a second performance parameter should be measured using a dynamic analysis, based on estimated accuracies of analyses results. In some cases, separate predictors may be utilized for the static and dynamic analyses, or, alternatively, a single predictor may be utilized for both analyses. In some cases, a static analysis may be performed as a default, and in case a result for a specific performance parameter is not sufficient, does not comply with one or more requirements, or the like, a dynamic analysis may be performed with respect to the performance parameter. In other cases, any other combination of static and dynamic analyses may be performed, based on any other conditions, rules, heuristics, or the like.

In some exemplary embodiments, performing a dynamic analysis may first require a compilation stage to compile the program for different cloud computers, e.g., as described in Step 130 of FIG. 1. The compilation stage may also be required, in some cases, for a static analysis. In some exemplary embodiments, compiling a program according to properties of a cloud computer may incur a cost (e.g., time costs, computational costs, or the like). In some cases, compiling a program for a first cloud computer may be more expensive than compiling the same program for a second cloud computer. In some cases, in order to reduce costs, an upper bound may be set on a number of cloud computers that are used for a dynamic analysis.

In some exemplary embodiments, an evaluation process may be performed to determine which cloud computers should participate in the dynamic analysis, taking into account compilation costs, results from a static analysis, a number of executions that should be utilized at participating cloud computers, or the like. For example, the evaluation process may select cloud computers that can participate in the dynamic analysis based on an estimated setup time and computational resources for compiling the program at a cloud computer, an estimated time for setting up executions in each environment, memory resources for compiling the program for a specific cloud computer, one or more constraints on the cloud computers, or the like. In some exemplary embodiments, the evaluation process may further determine a number of executions that the dynamic analysis should perform on each selected cloud computer, which is estimated to include a minimal number of executions that provides statistically significant results. For example, an execution task may comprise executing a program 10,000 times, and the evaluation process may determine, based on properties of a cloud computer, that the program should be executed 100 times on a first cloud computer and 50 times on a second cloud computer, in order to obtain accurate performance measurements of both computers. According to this example, the evaluation process may determine not to execute the program on a third cloud computer, since compiling the program for the third cloud computer may be expensive, and not to execute the program more than 50 times of the second cloud computer, since 50 times is sufficient for providing statistically significant results.

In some cases, instead of measuring the performance parameters by executing an entire instance of the program on different cloud computers as part of a dynamic analysis, the dynamic analysis may be performed by executing on the cloud computers one or more minor programs. The minor program may be a small program, with respect to the program, that is considered similar to the program, on the one hand, but on the other hand, is estimated to utilize, when executed on a quantum computer, less resources. In some cases, a minor program may be a sample or subset of the program. Additionally or alternatively, a minor program may be a program of a same type as the inspected program. In some exemplary embodiments, the minor program may be considered of a same type as the inspected program if both programs share one or more attributes. For example, in case a program comprises three quantum 'add' functions, the minor program may be generated to include one 'add' function being a representative of the three quantum 'add' functions. Additionally or alternatively, the shared properties between the minor program and the inspected program may relate to use of specific functions, use of specific types of gates, order of execution of different functions or gates, use of auxiliary qubits, uncomputation performance, entanglement between qubits, or the like. For example, the minor program may comprise a sample program that is configured to provide a subset of functionalities that are defined by the quantum program. In cases minor programs are used to represent the program, the minor programs may be compiled and executed instead of the inspected program. Differences between the minor program and the inspected program may be determined and used to adjust or normalize the execution results of the minor programs. In some cases, insights (e.g., error rates) may be inferred from the executions of the minor program, normalized to account for biases or differences between the minor program and the inspected program, and used to evaluate performance parameters of the inspected program. For example, according to the previous example, the result of executing the single 'add' function may be multiplied by three, to account for all three 'add' functions. In some cases, in case minor programs are used, they may be executed more times than the original programs without consuming excessive resources.

In some exemplary embodiments, the performance parameters that are evaluated may comprise one or more compliance parameters that are be configured to estimate whether a cloud computer holds sufficient resources for performing the computational task. For example, in case a cloud computer does not have sufficient physical qubits, auxiliary qubits, quantum gates, cycle-wise depth, or the like, for executing the execution task, the cloud computer may be filtered out from the list of candidate computers. In some exemplary embodiments, a quantum computer may be determined to violate the compliance parameter in case it has resources which are estimated to not be compliant with required resources of the execution task, a program within the execution task, or the like. In some exemplary embodiments, the filtering scheme may analyze, e.g., statically or dynamically, cloud computers that remain in the list of candidate computer after removing non-compliant platforms. In some exemplary embodiments, the performance parameters may be evaluated for each remaining execution pair, and utilized to compare performances of the execution pairs, costs of the performances, or the like. In some exemplary embodiments, the filtering scheme may avoid selecting non-compliant quantum computers for performing the execution task, for performing a dynamic analysis thereof, or the like, whereby avoiding costs of compiling and executing the program with respect to the non-compliant quantum computers.

In some exemplary embodiments, performance parameters that are measured during a static and/or dynamic analysis, may comprise a parallel execution parameter, a parallel execution cost parameter, a connectivity parameter, an execution-effectiveness parameter, an execution-time parameter, an execution-cost parameter, an error-rate parameter, an entanglement parameter, or any other parameter that relates to a performance of an execution pair, e.g., as described in Step 130 of FIG. 1. As an example, a connectivity parameter may be measured dynamically by executing or simulating an instance on a cloud computer, and measuring the number of swap operations that were implemented in the execution.

In some exemplary embodiments, after evaluating performance parameters, costs or scores thereof may be determined. In some exemplary embodiments, the values of the performance parameters may be utilized to determine respective costs, such as a cost in time, a cost in qubits per time unit, or the like. In some exemplary embodiments, since costs of different types of resources may have different priorities to different users, the filtering scheme may utilize one or more user-preference parameters, balances, quality metrics, or the like, such as a user's objective function, in order to balance or weigh costs of values of performance parameters and determine accordingly a selection of a cloud computer. In some exemplary embodiments, the objective function may indicate user-specific weights of performance parameter costs such as error rate costs, memory costs, time costs, a number of executions, or the like. In some exemplary embodiments, applying weights to the performance parameter costs may enable to obtain a comparable scoring metric for all cloud computers, from which a best performing cloud computer may be selecting for performing the execution task.

In some exemplary embodiments, based on estimated costs of different execution pairs, a cloud computer may be selected for performing the execution task. For example, the objective function may assign a weight to each type of cost, and an overall cost of each cloud computer may be estimated based on the costs of the performance parameters and the weights. In some exemplary embodiments, a cloud computer that obtains a lowest cost score according to the user's objective function, compared to other cloud computers, may be considered to have a best performance, and may be utilized for performing the execution task.

In some exemplary embodiments, in case a dynamic analysis was performed, the selected cloud computer may execute a remaining portion of the execution task that was not already performed as part of the dynamic analysis. For example, in case 100 executions of a program were performed separately at each of three different platforms, and the execution task comprises executing the program 3,000 times, the remaining 2,700 executions may be performed at the selected platform. In some cases, the execution task may be shared between one or more cloud computers, such as in case a best scoring cloud computer cannot perform the entire execution task himself. In such cases, a second best cloud computer may be utilized to execute the remaining instances of the execution task. As another example, a respective cloud computer may be selected for each program of the execution task, according to performance parameters that are associated to each program.

In some exemplary embodiments, evaluations of performance parameters may or may not provide a discrete value. In some cases, a performance parameter of an execution pair may be evaluated to comprise a value within an error boundary, which may comprise a range of values within an error threshold, e.g., between 8-11. In some exemplary embodiments, the range of values for a performance parameter may be analyzed to evaluate a respective range of expected costs or scores.

In some exemplary embodiments, in case of cost ranges, it may be more challenging to determine an overall cost of an execution task. For example, weights may be applied to cost ranges according to an objective function, but it may not be clear how the weighted ranges should be combined to an overall cost. In some exemplary embodiments, cost ranges of a same performance parameter may be compared over different cloud computer, in order to select better ranges over worse ranges. In case a lowest value in a range of values of a cost of a performance parameter that is associated to a first execution pair, is higher than a highest value in a range of values of a cost of the performance parameter of a second execution pair, the performance parameter of the first execution pair may be considered better than the performance parameter of the second execution pair. In such cases, a delta between the ranges, or an average value of each range, may be weighted, normalized, or the like, and used for determining the overall cost. In some cases, the second execution pair may be removed from the list of candidate platforms, and may not participate in the determination of the overall cost of each candidate cloud computer. For example, in case an overall cost of a first platform is estimated by a range of 15-20, while a cost of a second platform is estimated by a range of 10-14, the first platform may be discarded since every value of the range of the first platform is lower than every value of the range of the second platform.

In other cases, such as in case cost ranges of a performance parameter overlap, it may not be possible to decide which cloud computer performs better than the other. In such cases, further analysis of the performance parameters that effected the overall cost may be performed, such as in order to increase an accuracy of the performance parameters. In some exemplary embodiments, one or more performance parameters that were determined by a static analysis, may be determined instead, or additionally, using the dynamic analysis. In some cases, a static analysis may be performed to identify a range of values of a performance parameter, and a dynamic analysis may be performed in order to determine a discrete value (or a limited range) for the performance parameter, thereby enabling to limit the range of costs of the associated cloud computer, until a decision can be made regarding the cloud computers. For example, first and second value ranges may be measured for a performance parameter using a static analysis, and a cost function may be used to determine respective first and second cost ranges that correspond to the first and second value ranges. According to this example, a comparison of the first and second cost ranges may have an indefinite outcome, e.g., indicating that an overlap exists between the cost ranges. In such cases, in response to determining the indefinite result, a dynamic analysis may be performed for obtaining a definite outcome to the comparison, such as by measuring first and second discrete values, subranges, or the like, from the first and second value ranges of the performance parameter, until a comparison provides a definite result. For example, the dynamic analysis may iteratively execute more instances of the program until an evaluation of values of the performance parameter that is estimated based on the dynamic analysis provides a clear result, indicating which quantum computer has a better performance with respect to the performance parameter. In other cases, the dynamic analysis may enable to reduce the cost ranges of the performance parameter to two or more discrete cost values, sub-ranges of the first and second cost ranges, or the like, which may enable to obtain a definite result from a comparison between two or more computers. For example, the first and second cost ranges may include the ranges 4-17 and 3-18, respectively, which may overlap and therefore provide an indefinite result. According to this example, the reduces cost ranges may comprise the discrete values of 6 and 4, respectively, indicating that a first quantum computer associated with the first cost of 6 is more expensive than a second quantum computer that is associated with the second cost of 4. 100581 One technical effect obtained by the disclosed subject matter is enabling to select a cloud computer for performing an execution task, that optimizes an objective function, a cost function, or the like, and minimizes an incurred cost. In some exemplary embodiments, a software tool may be designed to receive indications of available cloud computers, and an objective function defining weights, costs, or user preferences that are defined with respect to one or more performance parameters (e.g., weights of a cost, an execution time, an error rate, or the like). In some exemplary embodiments, the tool may be configured to decide, according to the disclosed solution, where to execute an execution task in a manner that optimizes the objective function. In some cases, the decision, or a list of cloud computers with their respective scores from the objective function, may be indicated to the users, enabling the user to decide how to handle the execution task in an informed manner and in a user friendly manner. In other cases, the tool may automatically execute the execution task on the best scoring cloud computer.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Another technical problem dealt with by the disclosed subject matter is packing an execution task that comprises multiple instances of a quantum program, multiple quantum programs, or the like. For example, an execution task may comprise an execution of a first program forty times, an execution of a second program fifty times, and so on. It may be desired to pack or schedule the executions of the program instances in a manner that optimizes one or more metrics, objective functions, or the like.

Yet another technical problem dealt with by the disclosed subject matter comprises packing instances of an execution task with respect to a selected quantum computer, e.g., a cloud computer. For example, after a quantum computer is selected for performing an execution task, such as according to the method of FIG. 1, it may be desired to pack the instances of the execution task for execution at the selected platform. As another example, prior to selecting a quantum computer in accordance to the method of FIG. 1, a dynamic analysis may be utilized to obtain a performance parameter (e.g., a parallel execution parameter) that indicates a packing capability of the execution task at a candidate cloud computer.

Yet another technical problem dealt with by the disclosed subject matter comprises packing instances of an execution task in a manner that minimizes one or more resources that are used by the instances.

In some exemplary embodiments, a naïve packing scheme may comprise compiling each quantum program of the execution task to a respective quantum circuit (referred to as a 'program circuit') for the target quantum computer, and packing the program circuits according to their shapes. In some exemplary embodiments, each program circuit that corresponds to a program may comprise a shape, or outline of the resources that are utilized by the quantum circuit. For example, the shape of a program circuit may correspond to a range of cycles on a first axis, and a range of qubits that are used by the program circuit on a second axis. In some exemplary embodiments, the program circuits may then be packed into a single joint quantum circuit, e.g., according to their shapes, by ensuring that the shapes do not overlap with each other. In some exemplary embodiments, the joint circuit may be created based on one or more scheduling algorithms, such as by combining the shapes of the program circuits (e.g., each of which corresponding to an instance of a program indicated by the execution task) into a joint circuit. For example, a job shop scheduler may pack the program circuits according to their shapes, such that the program circuits do not overlap with each other, leaving each program circuit to utilize respective resources and cycles of the quantum computer. According to this example, two program circuits may be scheduled in parallel, such as in case that the target quantum computer comprises sufficient resources for executing the two program circuits in parallel without overlapping resources. In some exemplary embodiments, the joint circuit may be provided to the selected quantum computer, to be executed thereby.

In some exemplary embodiments, the naïve packing scheme may have one or more drawbacks. In some cases, the naïve packing scheme may be suboptimal in resource utilization. For example, a program may utilize auxiliary qubits at a beginning of the program (e.g., at a first function of the program), without using them at an end of the program (e.g., at a second function of the program). In such cases, the program may be compiled to a square shape to which the auxiliary qubits are assigned, although the auxiliary qubits are idle during multiple cycles at an end of the circuit. According to this example, the packing scheme may not enable any other program circuit to utilize the idle qubits, although the idle qubits are not used. In some exemplary embodiments, programs may typically utilize one or more auxiliary qubits as temporary workspace that may not be part of a quantum function logic flow. For example, auxiliary qubits may comprise qubits that do not store any information relevant to the quantum circuit's output. In some cases, it may be desired to overcome such drawbacks, and provide a scheme for packing programs in an efficient manner, such that auxiliary qubits will not remain assigned to a program in case they are idle or are not used by the program.

One technical solution provided by the disclosed subject matter comprises utilizing an enhanced packing scheme that is not limited to the shapes of the program circuits that are obtained from the compiler. In some exemplary embodiments, the enhanced packing scheme may differ from the naïve solution, at least since it may not pack compiled circuits, and the packing process may be performed according to packing constraints.

In some exemplary embodiments, an indication of an execution task that comprises one or more quantum programs may be obtained. For example, a user may provide an indication of an execution task that instructs to execute 500 instances of a first program, 200 instances of a second program, and one instance of a third program, thereby providing an execution task. In some exemplary embodiments, the indication of the execution task may be provided to a transpiler, a compiler, a packing scheme, or any other processing component associated to the packing scheme.

In some exemplary embodiments, the processing component, also referred to as a transpiler, may obtain the indication of the execution task, an indication of a program thereof, or the like, and an indication of a target quantum computer, properties thereof, constraints thereof, metadata thereof, or the like. In some exemplary embodiments, instead of generating a circuit implementation for each program, as performed by the naïve solution, the transpiler may create for each program at least one quantum DAG with quantum constraints.

In some exemplary embodiments, the transpiler may obtain an indication a quantum program, and determine one or more alternative implementations thereof that comply with the hardware constraints and properties of the target quantum computer. In some exemplary embodiments, each program that is specified in the execution task, may have one or more alternative implementations. For example, a first implementation of the program may utilize a greater number of qubits for a smaller number of cycles, while a second implementation of the program may utilize a smaller number of qubits for a greater number of cycles. As another example, a first implementation of the program may utilize a first set of auxiliary qubits for a quantum gate, while a second implementation of the program may utilize a different second set of auxiliary qubits for the gate. In some cases, the alternative implementations may only comprise implementations of a program in case that the implementations comply with properties of the target quantum computer, and in case that the implementations perform the same functionality as the implemented program. In some exemplary embodiments, the transpiler may obtain alternative implementations of a program from a library, a compiler, or the like, or generate the alternative implementations itself. For example, alternative implementations may be determined, as disclosed in U.S. application Ser. No. 17/450,583, titled "Functional-Level Processing Component for Quantum Computers", filed Oct. 12, 2021, which is incorporated by reference in its entirety for all purposes without giving rise to disavowment.

In some exemplary embodiments, for each alternative implementation of a program, a graph such as a quantum DAG that represents the implementation may be obtained, generated, or the like, e.g., by the transpiler. In some exemplary embodiments, a quantum DAG of a program implementation may represent precedence constraints among operations in the implementation. In some exemplary embodiments, a quantum DAG may be generated by separating an implementation of a program to its functionality blocks, to sub-functionality blocks, to any other disjoint portions of implementations of a program, or the like. For example, the transpiler may obtain quantum DAGs from a compiler, library, or the like. As another example, the transpiler may generate the quantum DAGs, such as by converting or transpiling each implementation of a program to a DAG diagram in which the nodes correspond to portions of the implementation, and the edges correspond to qubit movements between the portions. In some cases, the transpiler may select a gate level implementation for every node of a quantum DAG, according to the respective program implementation. For example, the nodes and the gate-level implementations thereof may correspond to the functional blocks disclosed in U.S. application Ser. No. 17/450,583, titled "Functional-Level Processing Component for Quantum Computers", filed Oct. 12, 2021, which is incorporated by reference in its entirety for all purposes without giving rise to disavowment.

In some exemplary embodiments, the quantum DAGs may be configured to indicate, mark, or provide one or more cues regarding quantum restrictions of the program. In some exemplary embodiments, the indicated quantum restrictions, also referred to as quantum constraints, may comprise constraints that define how nodes of different or same DAGs can be properly packed or compressed, e.g., without violating quantum properties, hardware constraints, program functionalities, or the like. In some exemplary embodiments, the quantum DAGs may comprise one or more visual or non-visual (e.g., audio, textual metadata) markings, indications, cues, or the like, of the quantum constraints. For example, visual cues may be marked on a quantum DAG to indicate the quantum restrictions. In some cases, the quantum restrictions may indicate a resource availability, resource constraints, restrictions, or the like. For example, quantum restrictions may indicate, with respect to a node of the DAG, whether a resource (e.g., a qubit) is assigned to a job (e.g., the node of the DAG), whether a resource is released from the node, whether or not qubits that exit a node are released, a state of released qubits, a type of released qubits, where the qubit must pass, or the like.

In some exemplary embodiments, a qubit that is outputted from a first node of a DAG and provided to a second node of the DAG, may be considered to be 'released' from the first node in case the qubit that is outputted from the first node can be used by another node that is not the second node. In some exemplary embodiments, resources that are not released by the first node may be considered 'locked', indicating that the resources can only be used by the second node (if exists), and cannot be used by other DAG nodes until being released, until being released and cleaned, or the like.

In some exemplary embodiments, each node of the quantum DAG may be represented as a job, e.g., of a blocking job shop scheduling problem in which a job continues to block a machine after being serviced, until the downstream machine needed by the job becomes available. In some exemplary embodiments, when a resource such as a qubit is used by a job (e.g., a DAG node) in job shop scheduling, the resource is then owned by that job, which prevents from other jobs to use the resource until the job releases the resource. In some exemplary embodiments, the blocking job shop scheduling problem may correspond, at least partially, to the problem disclosed in Mogali; Barbulescu; Smith. Efficient Primal Heuristic Updates For The Blocking Job Shop Problem. *European Journal of Operational Research.* Volume 295, Issue 1 (2021), Pages 82-101, ISSN 0377-2217, and in Madraki, G., Otala, J. Graph Modeling of Shop Schedulings. *Encyclopedia*, which are hereby incorporated by reference in their entirety for all purposes without giving rise to disavowment.

In some exemplary embodiments, implementation portions of a program, represented by a node of a quantum DAG, may constitute a job that utilizes qubit resources, similarly to a blocking job shop scheduling problem. In some exemplary embodiments, the quantum restrictions of quantum DAGs may define that non-auxiliary qubits that are manipulated by a job (e.g., a DAG node) may not be manipulated by any other node that is not part of the job, until the job releases the qubits. In some cases, when a resource such as an auxiliary qubit is released from a node, its state may be marked as clean or dirty, e.g., as may be measured at an end of the program. In some exemplary embodiments, a clean mark may indicate that the resource was released in a clean state (with a known state such as a zero state), while a dirty mark may indicate that the resource was released in a dirty state (with an unknown state, with a non-zero state, or the like). In some exemplary embodiments, auxiliary qubits may not always be cleaned when released from a node, but using the auxiliary qubits again may require a cleaning process to be applied to the qubit. In other cases, only clean auxiliary qubits may be released from a node, and the marking of dirty or clean resources may not be used, as it may be redundant.

In some cases, quantum restrictions may comprise one or more exceptions to a blocking job shop scheduling problem, e.g., a dirty auxiliary qubit exception. In some exemplary embodiments, the quantum restrictions of quantum DAGs may define that dirty auxiliary qubits may, exceptionally, be allowed to utilize a 'locked' resource that is already allocated to a node. In some exemplary embodiments, in contrast to all other types of qubits, dirty auxiliary qubits in a quantum DAG may be allowed to take over a resource, such as a qubit, that is owned by another node, and, after using the resource, release the resource in the same state. In some cases, a dirty auxiliary qubit taking over a resource may refer to implementing the dirty auxiliary qubit using a qubit that is owned by another node, task, or the like. For example, in case a first node of the DAG comprises a dirty auxiliary qubit that is utilized during three cycles, and a second node comprises a qubit that is idle during three or more cycles, the idle cycles of the second node may be utilized to implement the dirty auxiliary qubit of the first node. In some exemplary embodiments, in case idle resources are identified in a same node as the dirty auxiliary qubit, the idle resources may be allocated to the dirty auxiliary qubit only in case they are independent from the dirty auxiliary qubit, e.g., are not entangled therewith, are not manipulated by a same gate, or the like.

In some exemplary embodiments, since dirty auxiliary qubits are configured to obtain a qubit in a certain (known or unknown) state, and release the qubit in the same state, dirty auxiliary qubits may utilize allocated resources without harming the functionality of the program, by returning the utilized qubit in a same state in which it was obtained, without depending on the resource allocation of each node. In some cases, in case a qubit is allocated to be used as a dirty auxiliary qubit between first and second (e.g., non-adjacent or adjacent) cycles, the respective quantum DAG may be marked to identify therein the path of the dirty auxiliary qubit between the first and second cycles. For example, marks of state-retaining paths, including paths of dirty auxiliary qubits between cycles that retain their original states at a last cycle, may be utilized to indicate that the path can be transferred to any other node, and can utilize any qubit that is idle for a respective period of time, also in case the qubit is 'locked' or allocated to another task, node, or the like.

In some exemplary embodiments, a resulting quantum DAG may represent an implementation of an instance of a program by showing which resources are allocated and released from each node, which resources are utilized as dirty auxiliary qubits, or the like. In some exemplary embodiments, this information may be used by a scheduler, or packing agent, which may obtain quantum DAGs that represent respective program implementations of the execution task from the transpiler, e.g., instead of the naïve method of obtaining compiled quantum circuits, and pack the nodes of the DAGs. In some exemplary embodiments, a scheduler may obtain an indication of the quantum DAGs, an indication of the program that is implemented by each quantum DAG (e.g., indicating that two quantum DAGs implement the same program), a number of executions that are specified in the execution task for each program, hardware constraints of a target quantum computer such as a number of available qubits at the computer, or the like.

In some exemplary embodiments, the enhanced packing scheme may utilize a scheduler in order to compress or pack the quantum DAGs in accordance with their marked or indicated quantum restrictions. For example, the quantum DAGs may be packed according to whether or not qubits that are outputted from a node are released, are cleaned, or the like, thus enabling other nodes to utilize released resources. In some exemplary embodiments, the quantum DAGs may be packed, scheduled, compressed, or the like, by a packing agent such as a Constraint Satisfaction Problem (CSP) solver, a Job Shop Program (JSP), a job shop scheduler, or the like. In some cases, a CSP solver may select, for each program of the task, one or more quantum DAGs representing different implementations of the program, while a total number of quantum DAGs selected for the program complies with a constraint of the execution task. For example, in case the execution task requires a program to be executed 200 times, the CSP solver may select 90 quantum DAGs representing a first implementation of the program, 80 quantum DAGs representing a second implementation of the program, and 30 quantum DAGs representing a third implementation of the program, as long as the sum of executions is 200.

In some exemplary embodiments, since quantum DAGs are packed instead of compiled program circuits, the resulting packed circuit may combine nodes of different DAGs, enabling them to share qubit resources according to the quantum restrictions, to be performed in parallel, or the like. For example, a qubit that is released from a node may be utilized by another node or DAG, a qubit that is idle within a node may be utilized as a dirty auxiliary qubit of another DAG, or the like. In some exemplary embodiments, packing different portions of DAGs together, may enable to conserve resources and reduce a number of idle qubits. For example, since quantum DAGs may enable to release and reuse resources between nodes, and even within a node (in the case of a dirty auxiliary qubits), packing quantum DAGs may be flexible and resource conserving. Resources may be shared between nodes, quantum DAGs, or the like, in case that the resources are released auxiliary qubits, in case that the resources can be utilized for a number of cycles as a dirty auxiliary qubit, or the like.

In some exemplary embodiments, the scheduler may be configured to select quantum DAGs associated with one or more alternative implementations, and a number of executions of each quantum DAG. In some exemplary embodiments, in case there are multiple implementations for a quantum program, such as eight implementations, each implementation may be generated to a respective quantum DAG. In some exemplary embodiments, each implementation may be converted to a respective quantum DAG only in case the implementation complies with restrictions, properties, constraints, or the like, of a target quantum computer over which the task is prepared to be executed. For example, in case an implementation utilizes 50 qubit and a quantum computer comprises 40 qubits, the implementation may not be selected. In some exemplary embodiments, alternative implementations of a program, and their respective quantum DAGs, may be considered equivalent in outcome and functionality, although the usage of resources may vary between implementations.

In some exemplary embodiments, the scheduler may be configured to select quantum DAGs associated with one or more alternative implementations, according to packing properties of the DAGs. For example, in case the execution task comprises executing the program 500 times, and the scheduler determines that utilizing 300 times a DAG of a first implementation of the program, and utilizing 200 times a DAG of a second implementation of the program provides a most compressed result, the packing scheme may utilize the selected DAGs and the selected numbers of execution. In some exemplary embodiments, the scheduler may be restricted by the number of program executions that is specified in the execution task. For example, the scheduler may be required to ensure that the overall number of packed DAGs that implement a program is identical to the overall number of executions of the program that is specified by the execution task.

In some exemplary embodiments, the scheduler may be configured to pack the quantum DAGs representing selected implementations of each program, and to create a joint quantum circuit therefrom. In some exemplary embodiments, the scheduler may be configured to search for a packing configuration that performs the specified execution task, while maximizing a compression, minimizing a resource consumption of the resulting joint circuit, minimizing an objective function, minimizing a cost function, or the like. For example, a cost function may be configured to estimate a compression level of the DAGs. In some cases, the cost function may calculate a volume of a rectangle including a depth of joint circuit multiplied by the number of qubits, and the scheduler may attempt to minimize the cost function, minimize the number of cycles of the joint circuit, or the like. In some exemplary embodiments, such a cost function may not be optimal, at least since qubits within the measured rectangle may be idle, unused, or the like, indicating that the circuit can be packed in a more efficient manner. For example, the cost function may not take into account that a qubit that is released by a node, is not utilized by a subsequent node, although utilizing the released qubit may increase a compression level of the joint circuit.

In some exemplary embodiments, an enhanced cost function may be defined to measure effective areas of the joint circuit, instead of merely measuring an entire volume of the circuit. In some exemplary embodiments, an effective area of a circuit may comprise resources that are effectively used, that comprise blocked resources, or the like, such as paths of non-auxiliary qubits that are locked within a node of a DAG, paths of auxiliary qubits that are not released between nodes, or the like. In some exemplary embodiments, a locked path of a qubit may relate to a range of adjacent cycles during which the qubit is a locked resource that cannot be shared with other tasks. For example, a locked path of an auxiliary qubit may comprise a path of the qubit between first and second cycles (e.g., not necessarily adjacent cycles), where the qubit is assigned to a task at the first cycle and released from the task at the second cycle. In some exemplary embodiments, for each locked path of a qubit, the number of cycles of the locked path may be calculated, and determined to be part of an effective portion of the circuit. For example, a volume of locked paths may be determined be multiplied by the number of qubits in the path by the number of cycles of the path, by calculating an integral thereof, or the like.

In some exemplary embodiments, when measuring the effective size of a joint circuit that utilizes dirty auxiliary qubits, the effective size of the circuit may be configured to include blocked paths of dirty auxiliary qubits. For example, the sum of the effective size of the circuit may be increased by positioning a blocked path of a dirty auxiliary qubits in any unused area of the rectangle outline of the circuit, thereby increasing a percentage of used or locked resources compared to the unused area. In some exemplary embodiments, the effective area of a joint circuit may be increased by scheduling dirty auxiliary qubits in "holes" of the joint circuit, in which the qubits are idle even if not released.

In some exemplary embodiments, a benefit factor may relate to the volume of the circuit that can become effective due to allocations of dirty auxiliary qubits. As an example, in case a dirty auxiliary qubit utilizes 80 cycles, and 40 of these cycles can be positioned in various 'holes' of the circuit, the benefit factor may be determined to be 50% (e.g., since 50% of the utilization of the dirty auxiliary qubit does not require extra resources). According to this example, the dirty auxiliary qubit may count only as an addition of 40 cycles to the effective area. In some exemplary embodiments, the benefit factor may be evaluated experimentally. For example, dirty auxiliary qubits may be placed in various 'holes' of the circuit, and the percentage of reduced cycles may be measured (e.g., placing 50% of the cycles of dirty auxiliary qubits in other processes may result with a 50% saving as an experimental evaluation). After implementing various experiments of dirty auxiliary qubit placements, the different implementations may be compared accordingly. In some exemplary embodiments, the scheduler may take into account the various experimental evaluations when deciding which implementations of a program should be packed, and how many instances of each implementation should be packed.

In some exemplary embodiments, the scheduler may determine or obtain the effective areas of the circuit, such as by taking into account the benefit factor. In some exemplary embodiments, the scheduler may determine the non-effective areas of the circuit, such as by calculating a difference between the volume of the entire joint circuit and the effective area of the circuit. In some exemplary embodiments, the scheduler may calculate a volume of the non-effective areas of the circuit, and subtract the volume of the non-effective areas from the entire volume of the circuit in order to determine the volume of the effective area. For example, in case a first qubit is idle for three cycles and a second qubit is idle for twenty cycles, a volume of both may include twenty three idle time units or cycles, and the twenty three cycles may be subtracted from the entire volume of the circuit.

In some exemplary embodiments, the scheduler may attempt to minimize the non-effective areas of the circuit, such as by calculating a difference between the volume of the entire joint circuit and the effective area of the circuit (including a percentage of a volume utilized by dirty auxiliary qubits, indicated by the benefit factor), and attempting to minimize the difference. In some cases, the scheduler may be configured to minimize any other objective functions, such as in order to the reduce the overall non-effective areas of the circuit. In other cases, any other objective function or cost function may be defined, that may or may not attempt to reduce the non-effective areas of the circuit. For example, an objective function may allocate weights to each type of resource, and the scheduler may attempt to find a packing configuration that minimizes the utilization of resources according to the weights.

In some exemplary embodiments, the scheduler may be configured to reduce, in addition to or instead of the calculated non-effective area, one or more cost functions, such as a cost function measuring costs of a cleaning process which may be used in order to enable nodes to utilize released qubits. In some exemplary embodiments, a cost for cleaning or resetting a state of a qubit may be determined per the hardware. In some cases, a cost function may or may not remove from its calculation cleaning costs of qubits at an end of a joint circuit, e.g., at a last cycle thereof, at least in case such qubits are not reused for any subsequent DAG node. In some exemplary embodiments, any other cost functions may be utilized. For example, a cost function may measure parameters of the joint circuit such as a number of cycles of idle qubits, a number of released qubits that are not utilized by a subsequent node, a gap of cycles between releasing a qubit and a next utilization of the qubit, or the like. In some cases, equal weights may be assigned to each parameter of a cost function, or non-equal weights may prioritize some parameters over others.

In some exemplary embodiments, the scheduler may utilize one or more packing or compressing agents in order to pack the DAGS according to the determined cost function, objective function, or the like. For example, one or more job shop scheduling algorithms may be used to solve a blocking job shop scheduling problem corresponding to the quantum DAGs. In some exemplary embodiments, a job shop scheduling algorithm may be utilized in order to schedule quantum DAGs in a manner that minimizes one or more objective function measuring the makespan (e.g., a number of cycles) of the joint circuit, the non-effective areas thereof, or the like, similarly to the DAG scheduling that is disclosed in Cao; Zhou; Hu; Lin. An Adaptive Scheduling Algorithm for Dynamic Jobs for Dealing with the Flexible Job Shop Scheduling Problem. *Bus Inf Syt Eng* 61(3):299-309 (2019), which is hereby incorporated by reference in its entirety for all purposes without giving rise to disavowment. In some exemplary embodiments, one or more job shop scheduling algorithms may be utilized, similar to the algorithm disclosed in Barbosa; Monteiro. A List Scheduling Algorithm for Scheduling Multi-user Jobs on Clusters. (2008), which is hereby incorporated by reference in its entirety for all purposes without giving rise to disavowment. In other cases, a CSP solver may be used, although CSP solvers may not be scalable for an execution task that comprises a large number of programs such as 1,000 programs. In some exemplary embodiments, CSP solvers may be utilized to generate quantum DAGs based on an execution task, to compress or pack the quantum DAGs in an optimal manner in accordance to a cost function and quantum constraints, or the like. In other cases, any other packing method may be utilized for packing the quantum DAGs while minimizing one or more objective functions, while complying with the quantum restrictions of the quantum DAGs.

In some exemplary embodiments, a joint circuit may be generated to comprise the packing configuration of the quantum DAGs. In some exemplary embodiments, the joint circuit may be sent or provided to the target quantum computer, such as a cloud computer, for execution. In some exemplary embodiments, the computer may execute the joint circuit, such as by executing multiple program instances in parallel in case they were packed in a same range of cycles, enabling nodes to utilize released qubit resources, or the like. In some exemplary embodiments, the packing solution, including the joint circuit, may be translated or converted into a logical circuit, which may be provided to a hardware compiler of the quantum computer, for compiling the logical circuit to an executable quantum circuit that can be executed on the quantum computer.

In some cases, instead of packing the entire execution task in a single joint circuit, a modular circuit may be generated to comprise a portion of the execution task, in an equal ratio to the execution task. For example, in case the execution task comprises 1,000 executions of a first program and 2,000 executions of a second program, a modular circuit may comprise 250 instances of the first program and 500 instances of the second program. According to this example, four modular circuits may be utilized in order to complete the execution task.

One technical effect obtained by the disclosed subject matter is enabling to pack instances of an execution task in an efficient and resource conserving manner. In contrast to typical packing agents that can schedule full jobs, including square-shaped jobs, the currently disclosed subject matter enables to schedule job portions, with various shapes, by allocating nodes of DAGs for the implementation portions of the program and enabling different programs to utilize released qubits that are released from a node. For example, according to the disclosed subject matter, qubit resources that are released from a node of a program before the program ends may be utilized by a node of a different program.

Another technical effect obtained by the disclosed subject matter is enabling to pack quantum DAGs in accordance to quantum restrictions. By indicating or marking the quantum restrictions of each quantum DAG, a packing that does not violate the restrictions may be enabled.

Yet another technical effect obtained by the disclosed subject matter is pack program implementations in a flexible and resource conserving manner, such as by enabling to reuse resources between nodes, and even within a same node (in the case of a dirty auxiliary qubits).

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing an exemplary flowchart diagram of a method, in accordance with some exemplary embodiments of the disclosed subject matter.

On Step 110, a representation of an execution task may be obtained, e.g., from user, a remote server, or the like. In some exemplary embodiments, the execution task may indicate one or more quantum programs that are required to be executed, a number of instances of each program that are required to be executed, or the like. In some exemplary embodiments, the execution task may indicate that at least a first quantum program needs to be executed for a first number of times that is larger than two times. For example, an execution task may require a program to be executed 1,000 times on a quantum computer. In some exemplary embodiments, the execution task may indicate that at least a first quantum program needs to be executed for a first number of times, a second quantum program needs to be executed for a second number of times, and so on.

On Step 120, an indication of a set of two or more quantum computers, such as cloud computers, may be obtained. In some exemplary embodiments, the indication may indicate metadata regarding the quantum computers, such as hardware properties thereof, hardware constraints thereof, technologies used thereby, software properties thereof, properties of an execution environment thereof, or the like. For example, hardware constraints of a quantum computer may comprise a constraint on a number of qubits; a constraint on a number of gates of one or more types; a constraint on a number of cycles; a constraint on a ratio between the number of qubits and the number of cycles; or the like. For example, a first quantum computer of the set of two or more quantum computers may have a first set of hardware constraints, including a constraint of a first type (e.g., a limit on using more than 20 qubits), while a second quantum computer of the set of two or more quantum computers may have a second set of hardware constraints that exclude the constraint of the first type. In some exemplary embodiments, quantum computers that are indicated by the obtained indication of the set of quantum computers, may be available for executing at least a portion of the execution task.

On Step 130, performance parameters may be evaluated for each pairing of the execution task, or a program thereof, with a different cloud computer from the available cloud computers. For example, the available quantum computers may comprise at least first and second quantum computers, and a performance parameter of a quantum program that is included in the execution task may be evaluated by evaluating a first value of the performance parameter that is associated with the first quantum computer, evaluating a second value of the performance parameter that is associated with the second quantum computer, and so on. Any other values of the performance parameter may be estimated for respective additional quantum computers. In some exemplary embodiments, values of performance parameters may be measured based on a static analysis (with or without a compilation stage), a dynamic analysis, or the like. In some exemplary embodiments, a quantum program may be specified in the execution task as being required to be executed a first number of times (e.g., at least two times).

For example, a static analysis with a compilation stage may be used to evaluate performance parameters of the quantum program. A first value of a performance parameter of the program may be measured by compiling the program, or a portion thereof, to a first executable circuit (also referred to as 'compiled representation') that complies with hardware constraints of a first quantum computer. According to this example, based on properties of the first executable circuit, such as gates thereof, a number of cycles thereof, or the like, the first value of the performance parameter that is associated with the first quantum computer may be estimated, evaluated, or the like. According to this example, a second value of the performance parameter may be measured using a static analysis by compiling the program, or the portion thereof, to a second executable circuit that is different from the first executable circuit and complies with hardware constraints of the second quantum computer. Based on properties of the second executable circuit, the second value of the performance parameter may be estimated, evaluated, or the like. The estimations of the values of the performance parameter may be performed statically, without executing the executable quantum circuits. For example, the performance parameter may comprise an execution time, and the first and second values may be estimated based on the number of cycles in the first and second executable circuits.

As another example, a dynamic analysis may be used to evaluate performance parameters of the quantum program. A first value of a performance parameter of the program may be measured using a dynamic analysis by compiling the program, or a portion thereof, to a first executable circuit (also referred to as 'compiled representation') that complies with hardware constraints of a first quantum computer, and executing the first executable circuit for a second number of times (e.g., less than the first number of times). According to this example, based on the execution(s) of the first executable circuit, the first value of the performance parameter that is associated with the first quantum computer may be estimated. According to this example, a second value of the performance parameter may be measured using a dynamic analysis by compiling the program, or the portion thereof, to a second executable circuit that is different from the first executable circuit and complies with hardware constraints of the second quantum computer, and executing the second executable circuit for a third number of times (e.g., less than the first number of times). In some cases, a summation of the second number of times and of the third number of times may be lesser than the first number of times. For example, the execution task may indicate that the quantum program must be executed for 1,400 times, while the first and second executable circuits may be executed twice on each of the first and second quantum computers. Based on the execution(s) of the second executable circuit, the second value of the performance parameter that is associated with the second quantum computer may be estimated. It is noted that any analysis that is performed after a compilation of program, may not compile the compiled programs again but rather utilize the executable circuits that were generated in the previous compilation stage. For example, in case a static analysis was first performed and included compiling a program for two different quantum computers, the compiled program may be utilized for a subsequent dynamic analysis without re-compiling the program.

As another example, a status analysis without compilation may be used to evaluate performance parameters of the quantum program. For example, first and second values of a performance parameter of the program, such as a compliance parameter, may be measured based on a static determination of whether or not the first and second quantum computers have sufficient resources for executing the respective program. In some exemplary embodiments, costs, or resources that are utilized according to each performance parameter of an execution pair, may be determined statically, based on the high-level representation of the program (e.g., a non-compiled program) and metadata of the quantum computers, such as without compiling or executing analyzed quantum programs. As an example, a machine learning algorithm may be configured to estimate, based on high-level programs, performance parameters such as execution times, without compiling the programs.

In some exemplary embodiments, one or more compliance parameters may be configured to estimate whether a cloud computer holds sufficient resources (e.g., physical qubits, auxiliary qubits, quantum gates, cycle-wise depth, or the like) for performing the computational task, a program thereof, or the like. For example, the compliance parameter may be determined as part of a static analysis, by analyzing a program, by obtaining metadata regarding the capabilities of the cloud computer, by utilizing a machine learning predictor, or the like. In some exemplary embodiments, a compliance parameter may be utilized to determine whether or not the cloud computer is capable of executing the entire computational task, a single instance of a program thereof, all instances of a single program that is specified in the execution task, or the like. For example, in case the user requires the entire execution task to be performed on a single cloud computer, the compliance parameter may be used to filter out cloud computers that cannot execute the entire execution task, even in case it can execute instances of multiple programs thereof.

In some exemplary embodiments, a compliance parameter may measure, or obtain an indication of, one or more resources that are available at a cloud computer, such as a number of qubits available at the cloud computer, a ratio between a number of qubits and a number of cycles that are supported by the cloud computer, a number of gates that are available at the cloud computer, or the like. In some exemplary embodiments, the compliance parameters may measure one or more minimal requirements of the execution task or portion thereof, such as minimal resources that must be provided to a program thereof in order to enable it to be executed. For example, resource requirements of a program may comprise a minimal depth (or number) of cycles that is necessary for the program, a minimal number of physical qubits that may be necessary, a minimal number of logical qubits, or the like. In some exemplary embodiments, a quantum program may have one or more basic resource requirements that may not depend on an execution environment, such as a minimal number of qubits. In some exemplary embodiments, a quantum program may have one or more advanced resource requirements that may depend on a specific execution environment. In some exemplary embodiments, the resource requirements may be hardware independent, or may depend, at least in part, on a target cloud computer. For example, advanced resource requirements that are hardware-dependent may be assessed by compiling the program for the cloud computer, simulating the program, or the like, and comparing properties of the compiled or simulated program to the resources available at the cloud computer. In other cases, the measurement may be entirely static, without simulations or compilations.

In some exemplary embodiments, the resources of the cloud computer may be compared to the required resources of the task, and compliance of the cloud computer may be determined based on the comparison. In case an execution pair obtains a score of a compliance parameter that indicates that the resources at the cloud computer are insufficient for executing the task, e.g., a score of 0, or any other agreed upon value, the execution pair may be considered uncompliant. For example, in case the task requires at least 50 qubits and the cloud computer has only 30 qubits, the execution pair may be considered uncompliant. In some exemplary embodiments, a cloud computer that is uncompliant, and is not capable of executing the execution task, or a program instance thereof, may be filtered out and removed from the list of candidate cloud computers.

In some exemplary embodiments, in order to increase an accuracy of performance parameters, and/or enable to measure additional performance parameters, performance parameters may be measured based on a dynamic analysis, in addition to or instead of a static analysis. In some exemplary embodiments, a dynamic analysis may comprise executing or simulating the task or portion thereof on a cloud computer, a classical computer, a simulator, or the like, thereby experimentally measuring parameters for a given program and one or more cloud computers. In some exemplary embodiments, some parameters may be measured more precisely with a dynamic analysis. For example, an execution time of an instance of a program may be measured with an improved accuracy when executing or simulating the instance, with relation to a static analysis that uses heuristic estimations that may not be as accurate. In some exemplary embodiments, executing or simulating a program in practice, may enable to measure actual execution properties such as an actual time that elapsed when executing an instance of the program, an entanglement property of qubits in the program, or the like, without relying on theoretical estimates. In some cases, any combination of analyses may be made, including a static analysis without compilation alone, a static analysis with program compilation alone, a dynamic analysis alone, or any combination thereof.

In some exemplary embodiments, in order to perform a dynamic analysis, or a static analysis with compilation, one or more programs of the execution task may be compiled according to each cloud computer that remain in the list, a portion thereof (e.g., as decided by a predictor), or the like. In some exemplary embodiments, quantum computers may differ in their properties, structures, components, quantum technologies, qubit connectivity structures, or the like, which may affect a performance of the cloud computer when executing a program. For example, a cloud computer may have hardware constraints that may limit a number of qubits that can be utilized in parallel, a depth (e.g., a cycle-wise depth) of a program, a limit on a ratio between a number of qubits that are used and a depth of the program, or the like.

In some exemplary embodiments, in case a quantum program is intended to be executed on two or more different cloud computers with different properties, resources, or the like, the program may be required to be compiled separately for each quantum computer. For example, in case a first cloud computer supports a first type of quantum gate, and a second quantum computer supports, instead, a second type of gate, compiling a program for the first cloud computer may utilize the first type of gate, while compiling the program for the second cloud computer may utilize the second type of gate. In some exemplary embodiments, the different compiled versions of the program may be equivalent, as executing them may provide a same functionality, although different resources may be utilized by the different compiled versions. For example, compiled versions of a program may utilize a different number of qubits from each other, a different number of cycles, different execution times, or the like.

In some exemplary embodiments, during an initial stage of a compilation process, a quantum program (or portion thereof) may be translated, or converted, from a general representation of a circuit to a hardware-aware or hardware-specific representation of a circuit that takes into account properties or benchmarks of the cloud computer. For example, a general representation of a circuit may comprise a high level quantum program, a gate-level quantum program, a combination thereof, or the like, that is programmed by a developer without considering capabilities of specific hardware platforms. In some cases, cloud computers may provide or make available benchmarking or metadata thereof, including hardware constraints of each cloud computer, or any other metadata thereof.

In some exemplary embodiments, a transpiler may be configured to obtain the general representation of the circuit, along with benchmarks of the cloud computers, and attempt to generate for each cloud computer a hardware-aware program that complies with the constraints of the cloud computer. In case no such program exists, the transpiler may terminate or return an indication that it is not possible to create a hardware-aware program for the cloud computer. Otherwise, the transpiler may adjust the quantum program to the properties or benchmarks of the hardware platform, such as by selecting gates that are available in the target hardware. In some exemplary embodiments, the hardware-aware program may be generated or compiled based on hardware constraints of the computer that may limit a number of qubits, a depth of the program, or the like. For example, a hardware constraint of a computer may define that when using 40 qubits, a limit on the depth of the program may be 500, while when using 35 qubits, a limit on a depth of the program may be 600.

In some exemplary embodiments, the hardware-aware program may be created based on attributes of a hardware platform, as disclosed in U.S. patent application Ser. No. 17/450,584, tiled "Functional-Level Processing Component For Quantum Computers", filed Oct. 12, 2021, which is hereby incorporated by reference in its entirety for all purposes without giving rise to disavowment. For example, according to a hardware constraint of a cloud computer, the cycle-wise depth of programs that are executed thereon may monotonically decrease as a number of qubits is increased. For example, a program that utilizes 40 qubits, may have a limited depth of 500 cycles, while a program that utilizes 35 qubits, may have a limited depth of 600. In some exemplary embodiments, a hardware-aware program may be generated on premise, at the cloud, at a remote server, or the like.

In some exemplary embodiments, subsequently to generating the hardware-aware program, the hardware-aware program may be compiled, translated, transpiled, converted, or the like, to a hardware-specific program. In some exemplary embodiments, a hardware-specific compiler that is associated with the cloud may compile or convert the hardware-aware program to a hardware-specific program that can be executed directly on the hardware platform. In some exemplary embodiments, the hardware-specific compiler may be associated to a specific hardware platform, and may be used to compile the hardware-aware program according hardware properties such as a connectivity of the hardware, qubit placement, and other hardware properties, constraints, or benchmarks. In other cases, the hardware-specific compiler may obtain the general representation of the circuit and immediately compile it to a hardware-specific program, without utilizing the hardware-aware program.

In some exemplary embodiments, after compiling one or more programs to two or more hardware-specific programs that match respective cloud computers, the hardware-specific programs may be executed one or more instances of the program as part of the dynamic analysis. Alternatively, or additionally, the hardware-specific programs may be analyzed statically, as part of a static analysis, without executing the hardware-specific programs. In some exemplary embodiments, during the dynamic and/or static analyses, or based thereon, one or more performance parameters may be measured. In some exemplary embodiments, when evaluating a performance of an execution pair, including a cloud computer and a respect execution task, the compilation costs may be analyzed as well, in addition to the performance parameters.

In some exemplary embodiments, one or more performance parameters may be measured dynamically, e.g., using compiled hardware-specific programs for each cloud computer that is tested. For example, such performance parameters may comprise an execution-time parameter, an execution-cost parameter, an error-rate parameter, a connectivity parameter, or any other parameter that can be used to evaluate a performance of a cloud computer with respect to executing a program. In some cases, one or more performance parameters may be measured statically, and subsequently, in case a comparison between a performance parameter of two or more cloud computers does not provide a precise result, an accuracy of the performance parameter may be increased by measuring the performance parameter dynamically for the two or more cloud computers. In other cases, any other ratio or setting may be used to decide whether a dynamic analysis or a static analysis should be implemented at one or more defined stages.

In some exemplary embodiments, one or more performance parameters may be evaluated based on a potential packing scheme. In some exemplary embodiments, a packing scheme may be applied in order to pack instances of an execution task at two or more cloud computers, e.g., similarly to the packing scheme of FIG. 3. In some cases, after packing an execution task for a cloud computer, one or more properties of the execution task may be measured and utilized as performance parameters, e.g., a depth of the execution task, an average number of instances that are executed during each time unit, a number of time units, a number of cycles that are utilized by the packed execution task, or the like. For example, a first value of a performance parameter may indicate a first packing capability of an execution task at a first quantum computer, while a second value of the performance parameter may indicate a second packing capability of the execution task at a second quantum computer.

In some exemplary embodiments, a performance parameter may comprise a parallel execution parameter, indicating a maximal number of instances of the execution task that can be executed by a cloud computer during a defined unit of time (e.g., a cycle). For example, in case the computer has 2,000 qubits, and the program utilizes 300 qubits and needs to be executed 1,000 times, a packing scheme may pack six instances of the program in parallel. In some cases, such a configuration may provide a score of six, a normalized score thereof, or any other value. In some cases, the parallel execution parameter may be measured for a packed execution task that is packed by the packing scheme of FIG. 3.

In some exemplary embodiments, a cost of the parallel execution parameter may be estimated, such as by a parallel execution cost parameter. In some exemplary embodiments, the parallel execution cost parameter may measure a cost per time unit of executing the number of instances that are indicated by the parallel execution parameter, a cost per instance per time unit, or the like. For example, in case that the parallel execution parameter indicates that a packed or unpacked execution task includes a program that is executed five times by a cloud computer per time unit, and a cost of utilizing the cloud computer during the time unit is C, then the cost per instance per time unit may comprise C/5. In some cases, the cost may be determined by a cost function that is associated with the cloud computer.

In some exemplary embodiments, a performance parameter may comprise a connectivity parameter indicating a matching rate of the program to the connectivity configuration of a cloud computer. In some exemplary embodiments, an execution time that is needed for executing the program on a computer may be affected by a number of required swap operations, which may be influenced by a connectivity state of the cloud computer. In some exemplary embodiments, in case a connectivity of a computer matches a program in a high rate, the program may be easily converted to a physical representation, and executed on the cloud computer without requiring excessive swap operations. For example, a high match between a program and a connectivity of a cloud computer may indicate that a hardware compiling stage can allocate physical qubits to logical qubits without utilizing excessive swap operations (e.g., more swap operations than a threshold, a determined percentage, or the like).

In some exemplary embodiments, a cost associated to the connectivity parameter may comprise an execution time cost, indicating a ratio of the execution time that is incurred due to swap operations. For example, in case an execution time of a program is estimated to be 30 seconds, 30 cycles, or the like, and the swap operations are responsible for a third of the execution time (e.g., 10 seconds or cycles), then the cost of the connectivity parameter may be determined to be ⅓, a normalized value thereof, or any other value indicative of the time-wise ratio between swap operations and other operations.

In some exemplary embodiments, a performance parameter may comprise an execution-effectiveness parameter used to estimate an effectiveness of an execution of a program on a cloud computer. For example, a difference between the number of times that a program must be executed on the first computer in order to achieve a certain output, and the number of times that the same program must be executed on the second computer in order to achieve the same output may be determined. In some cases, in order to obtain a statistically significant output, a program may be executed multiple times, and resulting states may be sampled, measured, or the like. In some exemplary embodiments, the execution-effectiveness parameter may be estimated based on a dynamic analysis, e.g., by executing or simulating a program on different cloud computers, until reaching a defined error rate, a statistically significant result, or the like. In some exemplary embodiments, execution-effectiveness parameters of the same program when being executed at different cloud computers may be compared, a ratio between the parameters may be determined, or the like. In some exemplary embodiments, a cloud computer that enables to achieve the same result with a same quality output as another computer, using less program executions, may be considered time conserving compared to the other computer. In some exemplary embodiments, a cost of the execution-effectiveness parameter may comprise a number of executions that are required to be performed in order to obtain a result that complies with one or more constraints, e.g., an error rate constraint. The cost may comprise the number of executions, a normalized value thereof, a ratio between the number of executions and a threshold, or the like.

In some exemplary embodiments, a performance parameter may comprise an execution-time parameter used to estimate the time of execution of a program on a cloud computer. In some cases, the execution-time parameter may be estimated statically, without executing or simulating the program, based on statically determined properties of the program that is being executed, properties of the cloud computers that are being tested, or the like. For example, in case a connectivity state of the cloud computer matches the structure of a program, less swap operations may be required to align the connectivity of the computer to the program, and the execution time may be reduced. In some cases, an execution time of an execution pair may be estimated based on one or more properties of the cloud computer, the program, a matching therebetween, or the like. In some exemplary embodiments, the execution-time parameter may be estimated based on a dynamic analysis, e.g., by executing or simulating a program on a cloud computer, and measuring an execution time thereof. The program may be dynamically executed or simulated for a small number of times at each platform (e.g., once). In some cases, simulating or executing the program a small number of times at each platform, such as once, may conserve time resources, computational resources, or the like, while obtaining accurate time measurements.

In some exemplary embodiments, a cost of an execution of an instance of a program at a cloud computer, also referred to as an execution-cost parameter, may correlate to the execution-time parameter. A cost of the execution-time parameter may comprise a cost in time units with respect to a single program execution, a normalized value thereof, a time-wise metric, a summed cost per time unit, or the like. For example, a cost of the execution may be measured using a time-wise metric such as a cost-per-time unit (e.g., minute, second, or the like), which may be multiplied by the number of time units indicated by the execution-time parameter. In some cases, the cost may refer to a cost of a single execution of the program, two executions of the program, or any other defined number of executions. As an example, an execution-cost parameter for an execution task that includes 30 instances of a first program and 50 instances of a second program, may be determined dynamically by executing a single instance of the first program at the listed candidate computers, and executing a single instance of the second program at the cloud computers. In other cases, the execution-cost parameter may be estimated statically, such as by estimating a cost of an execution on a cloud computer.

In some exemplary embodiments, a performance parameter may comprise an error-rate parameter indicating an error rate of executing a program for a determined number of times. In some cases, in order to obtain a statistically significant output, a program may be executed multiple times, and resulting states may be sampled, measured, or the like. In some exemplary embodiments, the error-rate parameter may be measured dynamically, such as by executing a program for a same number of times on different execution platforms, and measuring an error rate that results in each platform. In some exemplary embodiments, the error rates of output qubits may be measured at each platform for a same defined number of executions, and averaged, normalized, or the like, in order to provide a comparable metric. As another example, the error-rate parameter may be measured by detecting a number of times that each program must be executed in order to obtain equivalent error rate results. In some cases, the number of times of executing the program at each platform may be determined to be small, e.g., less than a threshold, in order to conserve resources. In some exemplary embodiments, a cost of the error-rate parameter may refer to the number of executions or time resources that are needed in order to reach an error rate threshold.

In some exemplary embodiments, a performance parameter may comprise a packing parameter indicating packing capabilities of different platform with respect to a same program. This parameter may be measured for a program in the execution task, and used to compare packing capabilities of a same program at different cloud computers, respective costs thereof, or the like. For example, instances of a program may be compiled and packed at different platforms, e.g., according to the method of FIG. 3, and the packed circuit may be analyzed to identify a ratio between a number of instances of the program and the number of cycles. In some cases, costs associated with different packings of the program may be measured and compared between platforms. In one scenario, an instance of a program may be implemented at two different platforms using a same number of cycles, e.g., 150 cycles. According to this scenario, although executing a single program instance may result with an identical or similar number of cycles, the packing performance parameter may differ between the platforms in view of packing capabilities of multiple instances. For example, in case the execution task indicates that ten instances of the program must be executed, the packing scheme of FIG. 3 may enable to pack ten instances of the program using 1,000 cycles at a first platform, and using 1,300 cycles at a second platform. This may indicate that the first platform overperforms the second platform in a packing aspect, incurring respective costs.

In some exemplary embodiments, a performance parameter may comprise an entanglement parameter indicating entanglement properties of qubits during an execution or simulation, after the execution or simulation, or the like. In some exemplary embodiments, the entanglement parameter may indicate a level of entanglement of the program, which may affect an error rate of the program.

On Step 140, a quantum computer may be selected for executing the execution task or portion thereof. In some exemplary embodiments, the filtering scheme may utilize one or more user-preference parameters, quality metrics, or the like, such as a user's objective function, in order to balance or weigh costs of performance parameters, determine an overall cost of each cloud computer, and select accordingly a cloud computer.

For example, costs of executing each program that is specified in the execution task on a cloud computer may be estimated based on the performance parameters, the costs may be normalized based on an objective function, multiplied by the number of instances of the program that is specified in the execution task, and summed up over all programs to determine an overall cost of executing the execution task at the computer. According to this example, the overall costs may be compared between cloud computers, and a computer with a lowest cost may be selected. In some cases, the cloud computer may be selected based on first and second values of a performance parameter of a program that indicate that a first quantum computer, for which the first value was estimated, overperforms a second quantum computer, for which the second value was estimated.

In some exemplary embodiments, an objective function may indicate user-specific weights of costs such as error rates, costs, time resources, a number of executions, or the like, of performance parameters, or the like. In some exemplary embodiments, applying weights to the costs may enable to obtain a comparable scoring metric for all cloud computers, from which a best performing cloud computer may be selected for performing the execution task. For example, a cloud computer that obtains a lowest weighted cost that is weighted according to the user's objective function, compared to other cloud computers, may be considered to have the best performance. As another example, a first cost may be computed for a first quantum computer based on an objective function and based on a first value of a performance parameter that is associated with the first quantum computer, while a second cost may be computed for a second quantum computer based on the objective function and based on a second value of the performance parameter that is associated with the second quantum computer. According to this example, a quantum computer may be selected for the execution task based on the first and second costs, such as by selecting a computer with a lower cost.

In some exemplary embodiments, in case a dynamic analysis is not performed, a cost of an execution pair may be estimated without compiling or transpiling the program. In some cases, the program may be analyzed to generate a Directed Acyclic Graph (DAG) that represents the program. For example, each block of the DAG may represent a function or functional block of the program, and edges between blocks may indicate qubits that connect the functions. In some exemplary embodiments, the DAG may be hardware independent. In some exemplary embodiments, a statistical estimation for an overall cost of running the program on each cloud computer may be determined based on a statistical analysis of past executions of the cloud computers, past executions of functional blocks of the DAG, statistical analyses of past executions, costs thereof, or the like.

In some exemplary embodiments, in case a dynamic analysis is performed, a statistical estimation for an overall cost of running the program on each cloud computer may be determined based on dynamically determined performance parameters, such as based on a parallel execution cost parameter, an execution-cost parameter, or the like. As an example, using a dynamic analysis, a single instance of a program may be executed on a cloud computer, and a cost thereof may be measured and used to estimate costs of executions of multiple instances of the program. The resulting costs may be measured and compared, to identify which cloud computers have lowest or relatively low costs.

As an example, the execution-cost parameter may be measured for each program in the execution task, and used to compare costs of executing a same program at different cloud computers. As another example, a first program may be executed by a first quantum computer t times for a cost of C per hour, while a second program may be executed by a second quantum computer t' times for cost of C' per hour. According to this example, the first program and the second program may comprise different hardware-specific implementations of a same program that are equivalent, overall, since executing them a defined number of times (e.g., t or t' times, respectively) may obtain a same result. However, the programs may differ in one or more properties thereof such as a number of qubits that are used thereby, a number of cycles, a time of execution, or the like. In some exemplary embodiments, the number of times that each program must be executed in order to obtain equivalent results may be determined, and used to compare the costs of the program executions, the error rates thereof, or the like.

In some exemplary embodiments, the selected quantum computer(s) may be used to executed the entire execution task, or to complete an execution of remaining portion of the execution task. For example, in case a dynamic analysis was performed by executing a program for a certain number of times, the selected computer may not be required to perform these executions again. In some exemplary embodiments, the number of times that a program must be executed at the selected quantum computer may comprise a number that is equal to: $N_1-(N_2+N_3)$, wherein $N_1$ is the number of times of executing the program as specified in the execution task, $N_2$ is a number of times that the program was executed at a first computer during a dynamic analysis, and $N_3$ is a number of times that the program was executed at a second computer during a dynamic analysis. In other cases, any other number of quantum computers may be used as part of the dynamic analysis. For example, in case a third quantum computer was used during a dynamic analysis, the number of times that the program must be executed at the selected quantum computer may comprise: $N_1-(N_2+N_3+N_4)$, wherein $N_4$ is a number of times that the program was executed at the third computer. This may enable to implement the execution task while utilizing previous executions that were performed as part of the dynamic analysis, thereby conserving time and computational resources.

Figure 2A:
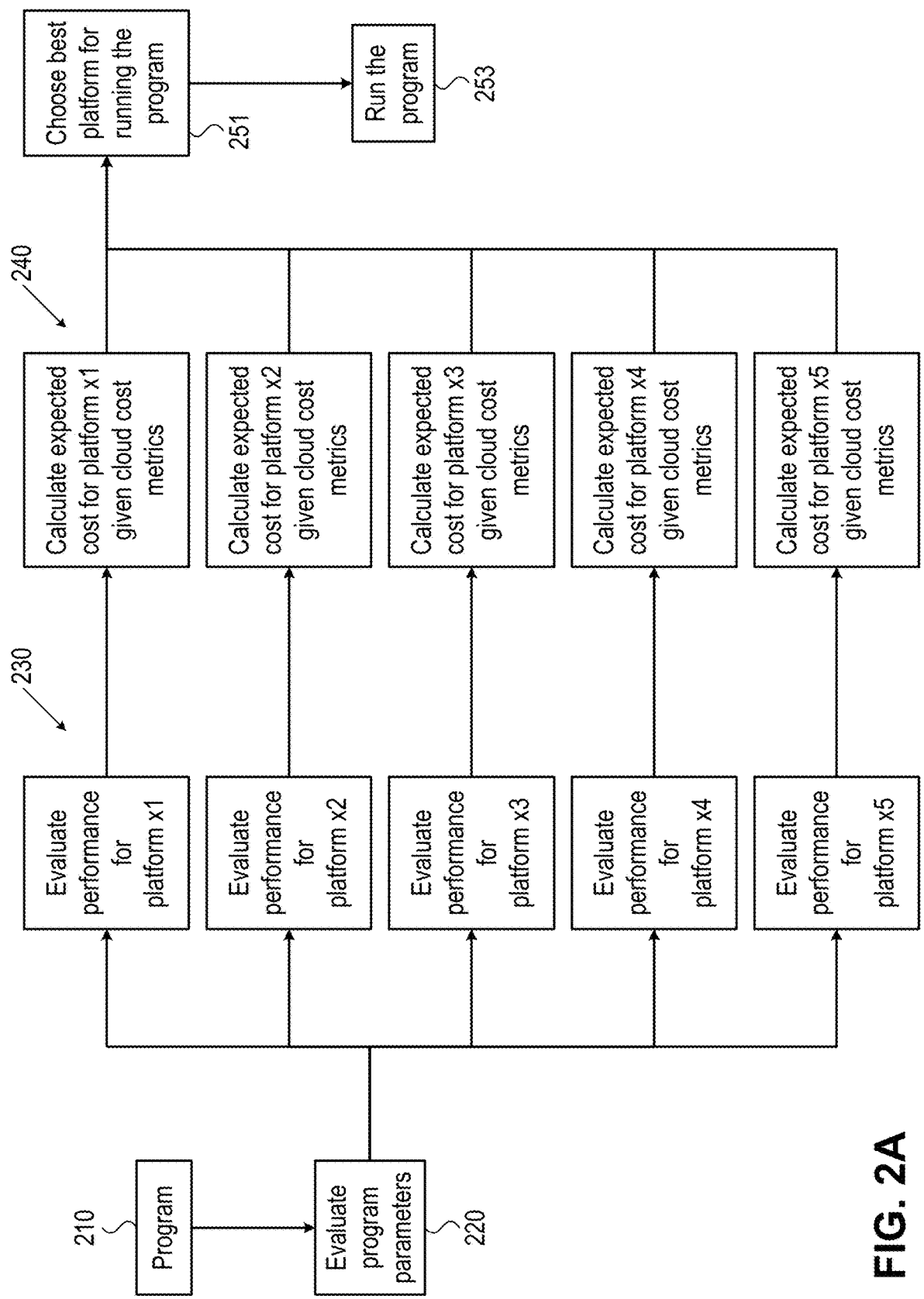
FIGS. 2A-2B illustrate exemplary platform selection schemes, in accordance with some exemplary embodiments of the disclosed subject matter.
Figure 2B:
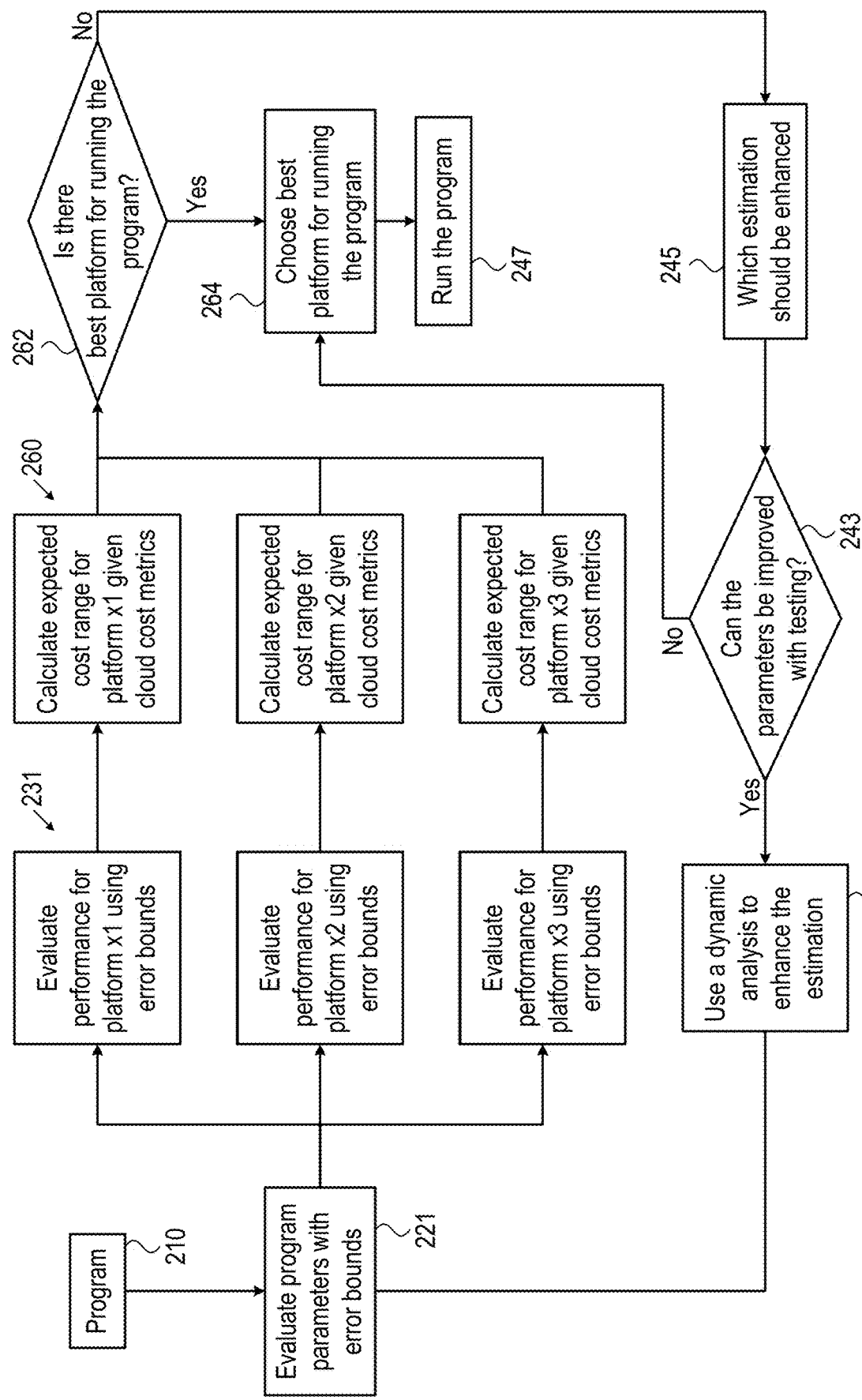

Referring now to FIGS. 2A-2B, illustrating exemplary platform selection schemes, in accordance with some exemplary embodiments of the disclosed subject matter.

Referring now to FIG. 2A, a Program 210, or a representation thereof, may be obtained, determined, or the like, e.g., as part of an execution task. In some exemplary embodiments, Program 210 may belong to an execution task that needs to be executed a defined number of times on a cloud computer. In order to select a cloud computer for executing Program 210, performance parameters may be selected (220) and utilized to evaluate a performance of each available cloud computer with respect to Program 210. In some exemplary embodiments, the performance parameters may be evaluated, such as by evaluating a performance of each execution pair (230) using a static analysis, a dynamic analysis, or the like. Each cloud computer may be scored (240) by an objective function, a cost function (e.g., comprising cloud cost metrics), or the like, based on the determined performance parameters. In some exemplary embodiments, a cost for executing Program 210 at each platform may be determined, such as based on configurations of the cloud computers' execution environments, cloud provider costs, or the like. In some exemplary embodiments, a cloud computer that scores a best score (e.g., a lowest cost, a highest score of the objection function) may be selected (251) for executing Program 210. In some exemplary embodiments, after selecting a cloud computer, Program 210 may be executed thereon (253).

Referring now to FIG. 2B, Program 210, or a representation thereof, may be obtained. In order to select a cloud computer for executing Program 210, performance parameters may be selected (221) and utilized to evaluate a performance of each available cloud computer with respect to Program 210. The performance parameters may be evaluated with discrete values, or with error boundaries, including a range of values within an error threshold. Performance parameters for each execution pair may be evaluated using a static analysis, a dynamic analysis, a combination thereof, or the like. For example, error boundaries of performance parameters for each execution pair may be determined (231) using a static analysis. A cost of each evaluated cloud computer may be determined (260) according to performance parameters thereof. For example, in case an execution time parameter is determined to be between 3 and 9 time units (according to a static analysis), and a cost of utilizing the cloud computer for 3 to 9 time units is 15 to 40 cost units, then the cost of the cloud computer may be determined to be within a range of 15 to 40 cost units. The score ranges may be compared to determine whether one of the cloud computers has a better range of values (262). The selection may utilize the objective function, the cost function, or the like, which may be applied to ranges of values of performance parameters. For example, in case a value of a performance parameter of a first execution pair is 2-17, and a value of the performance parameter of a second execution pair is 19-22, the second execution pair may be considered to overperform the first execution pair (or the opposite, in case the performance parameter measures negative attributes).

In some exemplary embodiments, range of values of a same performance parameter may be measured over different execution pairs, for each performance parameter. In some exemplary embodiments, the results may be weighted, combined, or the like, in order to obtain overall scores of each execution pair. In case a cloud computer has a better range of values than the remaining cloud computers, the cloud computer may be selected for executing Program 210 (264). In some exemplary embodiments, after selecting the cloud computer, Program 210 may be executed thereon (247).

In case no cloud computer is determined to have a better overall score then the remaining cloud computers, or in case one or more comparisons of values of performance parameters were not decisive (e.g., in case of overlapping value ranges), one or more additional steps may be taken in order to detect the best cloud computer. For example, in case a range of values of a performance parameter of an execution pair overlaps with a range of values of another execution pair, it may not be clear which execution pair performs better in regard to the performance parameter. This may also adversely affect the accuracy of the overall score. In some exemplary embodiments, performance parameters with undecisive comparison results may be detected (245). In some exemplary embodiments, an estimation may be made as to whether or not implementing a dynamic analysis for estimating the detected performance parameters is expected to enhance the accuracy of the performance parameter (243). In case the dynamic analysis is estimated to enhance an accuracy of the performance parameters, the dynamic analysis may be performed (241). For example, the dynamic analysis may be performed by compiling Program 210 for two or more cloud computers, renting the cloud computers or utilizing them in any other way, and executing the compiled versions of Program 210 on each cloud computer for a determined number of times. Based on the dynamic analysis, the range of values of the performance parameter may be reduced to a reduced range of values, or even converted to a concrete value. The newly determined values of the performance parameter may be compared to determine in an informed manner which cloud computer overperforms the rest. For example, the performance parameters of each cloud computer may be weighted according to an objective function and used to score the cloud computers. In some exemplary embodiments, a cloud computer that scores a best score, range of scores, or the like, may be selected for executing Program 210, or remaining executions thereof that remain after performing the dynamic analysis.

Figure 3:
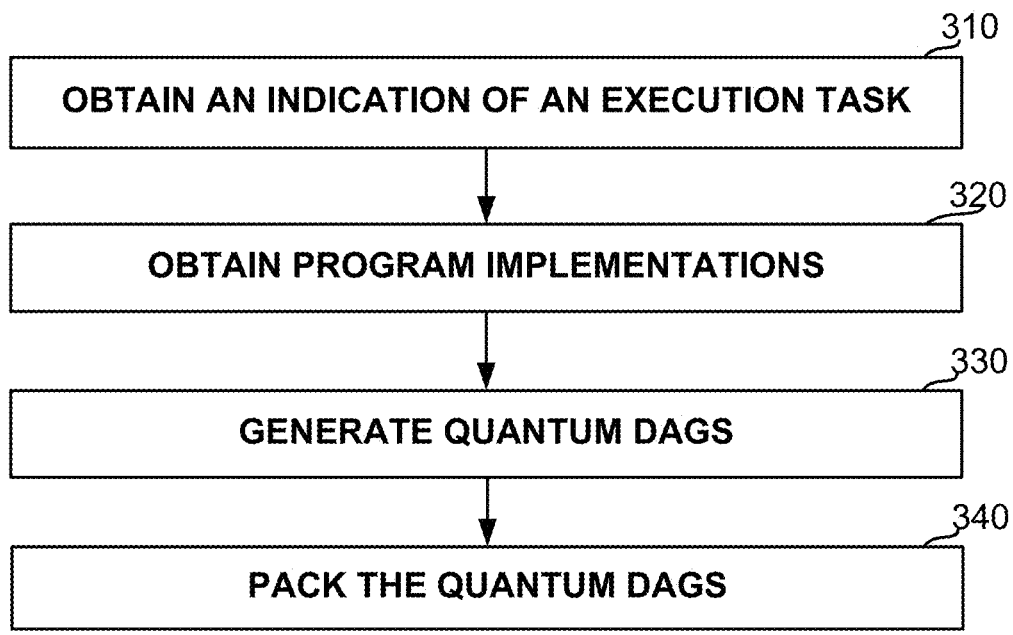
FIG. 3 shows an exemplary flowchart diagram of a method, in accordance with some exemplary embodiments of the disclosed subject matter.

Referring now to FIG. 3, showing an exemplary flowchart diagram of a method, in accordance with some exemplary embodiments of the disclosed subject matter.

On Step 310, an indication of an execution task may be obtained, e.g., from user, a remote server, or the like. In some exemplary embodiments, the execution task may indicate one or more quantum programs that are required to be executed on a target quantum computer, a number of instances of each program that are required to be executed, or the like. In some exemplary embodiments, the execution task may indicate that a first quantum program is to be executed a first number of times, that a second quantum program is to be executed a second number of times, or the like. In some cases, the execution task may indicate multiple quantum programs needs to be executed at least one time.

For example, the execution task may indicate that a quantum program should be executed two or more times on a target quantum computer. In some exemplary embodiments, the target quantum computer may be indicated in a separate or a same indication. For example, the computer may be selected from a set of remotely available quantum computers that are available for implementing execution tasks, such as according to the selection process of Claim 1.

In some exemplary embodiments, the execution task may comprise a subset of an aggregated execution task. In some exemplary embodiments, the aggregated execution task may be split into two or more sub-execution tasks for different quantum computers. For example, the aggregated execution task may be split into a first sub-execution task that is to be performed by a first quantum computer, and into a second sub-execution task that is to be performed by a second quantum computer. In some exemplary embodiments, the steps of FIG. 3 may be performed separately for the first sub-execution task with respect to the first quantum computer, and for the second sub-execution task with respect to the second quantum computer, thereby implementing the aggregated execution task in a distributed manner.

On Step 320, implementations of quantum programs specified in the execution task may be obtained, generated, or the like. For example, a library of multiple program implementations may be utilized to identify implementations of a quantum program. As another example, a generator may be used to dynamically generate implementations of a quantum program. In some exemplary embodiments, a program may have multiple alternative implementations, each associated to a different resource utilization, a different execution time, or the like. For example, a quantum program may have at least two different gate-level implementations, each of which performing the same functionality of the quantum program using a different allocation of resources, a different order of allocated resources, or the like.

On Step 330, graphs, such as quantum DAGs, may be generated for each program implementation that is obtained on Step 320. In some exemplary embodiments, multiple quantum DAGs may correspond to respective implementations of a quantum program. For example, a quantum DAG may represent a gate-level implementation of a quantum program that is specified in the execution task. In some exemplary embodiments, the quantum DAGs may be locally generated, such as by a transpiler at an end device of a user, or obtained from a remote server as a result of a communication session between the end device and the remote server. For example, as part of such a communication session, the end device may provide to the server implementations of a program, and the server, or a transpiler thereof, may provide, in response, corresponding graphs that may be used in a packing scheme. In some exemplary embodiments, a quantum DAG that is generated or obtained may comprise two or more nodes that are connected by edges. The two or more nodes may correspond to implementation portions of the quantum program, while the edges may correspond to qubits that are utilized shared between implementation portions. For example, a node of a quantum DAG may implement at least a portion of the quantum program.

In some exemplary embodiments, quantum restrictions may be marked on each quantum DAG, e.g., by the transpiler, thereby indicating when resources are assigned and released, movable paths of dirty auxiliary qubits, or the like. For example, quantum restrictions may be depicted in a quantum DAG that represents a gate-level implementation of a quantum program, using visual cues, audio cues, or the like. As another example, quantum restrictions of a graph may be indicated without marking the graph, such as via textual data associated with the graph, a metadata indication, or the like.

In some exemplary embodiments, quantum restrictions of a quantum program may define that a qubit cannot be used by another node unless it is released in a clean state, released in any state, or allocated to a dirty auxiliary qubit. In some exemplary embodiments, quantum restrictions may indicate whether a qubit that is outputted from a node of the two or more nodes is released, whether the qubit is released in a clean or dirty state, or the like. In some exemplary embodiments, quantum restrictions may define that a qubit can be used by a dirty auxiliary qubit of the another node, even in case the qubit is not released, such as in case that the qubit is idle, and that the dirty auxiliary qubit returns the qubit in the same state in which it was obtained.

On Step 340, multiple quantum DAGs may be packed according to a packing scheme. In some cases, the packing scheme may obtain quantum DAGs representing program implementations, as well the quantum restrictions thereof which may or may not be marked directly in the quantum DAGs. Each quantum DAG may represent a single execution of a program. In some exemplary embodiments, the packing may be configured to pack the quantum DAGs according to specifications of the execution task, such as the quantum restrictions, to thereby synthesize a joint circuit implementing the execution task for execution at the quantum computer. For example, executing the joint circuit at the quantum computer may cause the quantum program to be executed a number of times that is specified in the execution task, e.g., at least two executions.

In some exemplary embodiments, different quantum DAGs may implement a same quantum program. In some exemplary embodiments, the packing scheme may be configured to select quantum DAG implementations for each program (e.g., represented by quantum DAGs), a number of instances of each quantum DAG, or the like, and pack the quantum DAGs accordingly for the hardware platform of the target quantum computer. For example, the packing scheme may select at least two instances of a quantum DAG implementing a program, two instances of different quantum DAGs implementing the program, or the like, and pack the quantum DAGs according to their quantum restrictions. For example, a first quantum DAG may represent a first implementation of quantum program, and a second quantum DAG may represent a second implementation of the quantum program. According to this example, the packing scheme may pack at least one instance of the first quantum DAG, at least one instance of the second quantum DAG, or the like, as long as a sum of instances of the first and second quantum DAGs in the joint circuit, is equal to the number of times of executing the quantum program, as specified in the execution task. In some cases, although a total number of graph instances that implement the quantum program may be equal to the number of times that is specified in the execution task, the quantum program may be represented by two different quantum DAGs, or any other graph instances of one or more gate-level implementations of the quantum program, as long as a total number of quantum DAGs is equal to the specified number in the execution task. In some exemplary embodiments, the joint circuit may be executed on the quantum computer.

In some exemplary embodiments, the packing scheme may obtain the quantum DAGs, as well as cleaning operations that may be required in order to release qubits from quantum DAG nodes, and pack the quantum DAGs using one or more packing schemes such as using a CSP solver, a job shop scheduler, or the like, which may be required to comply with the quantum restrictions. In some scenarios, such as in case the quantum computer has sufficient resources for executing a single instance only, the packing scheme may not be used. In such cases, the program instances may be executed sequentially, one after another.

In some exemplary embodiments, the packing of the quantum DAGs may be performed according to one or more objective functions. In some exemplary embodiments, a number of cycles that are required in order to clean or restart a state of an auxiliary qubit may be scheduled. In some exemplary embodiments, the packing scheme may be configured to minimize the objective function. For example, the packing scheme may attempt to pack as many quantum DAGs as possible on the available matrix of qubits and time (e.g., cycles) of the quantum computer. As another example, the objective function may measure a non-effective volume of the joint circuit, and the packing scheme may be configured to minimize the non-effective volume of the joint circuit.

In some exemplary embodiments, instead of utilizing a simple objective function that measures an overall depth or an overall number of qubits that are utilized by the joint circuit, a scheduler such as a job shop scheduler or a CSP solver may utilize an objective function that measures an effective area or ratio of the joint circuit, that measures a number of instances in each unit of time (e.g., on average), that evaluates a packing level of the circuit (e.g., according to FIG. 7), or any other objective function. In some exemplary embodiments, an effective volume of the joint circuit may comprise locked paths of the joint circuit, each of which including a path of a qubit during which the qubit is a locked resource that cannot be shared with other tasks. For example, a qubit that is assigned to a node may be locked during the cycles of the node. As another example, a qubit that is assigned to two or more subsequent nodes, without being released from the intermediate nodes, may be locked during the cycles of the nodes. In some exemplary embodiments, the effective volume of the joint circuit may be calculated based on assigning a dirty auxiliary qubit to an idle portion of a locked path of a qubit. In some exemplary embodiments, an objective function may be configured to subtract the effective volume of the joint circuit from an overall volume of the joint circuit, in order to calculate the non-effective volume, and attempt to minimize the non-effective volume.

As an example, the packing scheme may assign a set of physical qubits to implement a first node of a quantum DAG during a first cycle range, assign the same set of physical qubits to implement a node of a different quantum DAG during a second cycle range, and assign the same set of physical qubits to implement a second node of the quantum DAG during a third cycle range. In this scenario, the second cycle range is subsequent to the first cycle range, and the third cycle range is subsequent to the second cycle range. This scenario may enable a packing agent to pack program implementations in a flexible, combined way, which may not be feasible in a packing scheme that is not implemented using the disclosed quantum DAGs with the marked quantum restrictions.

Figure 4:
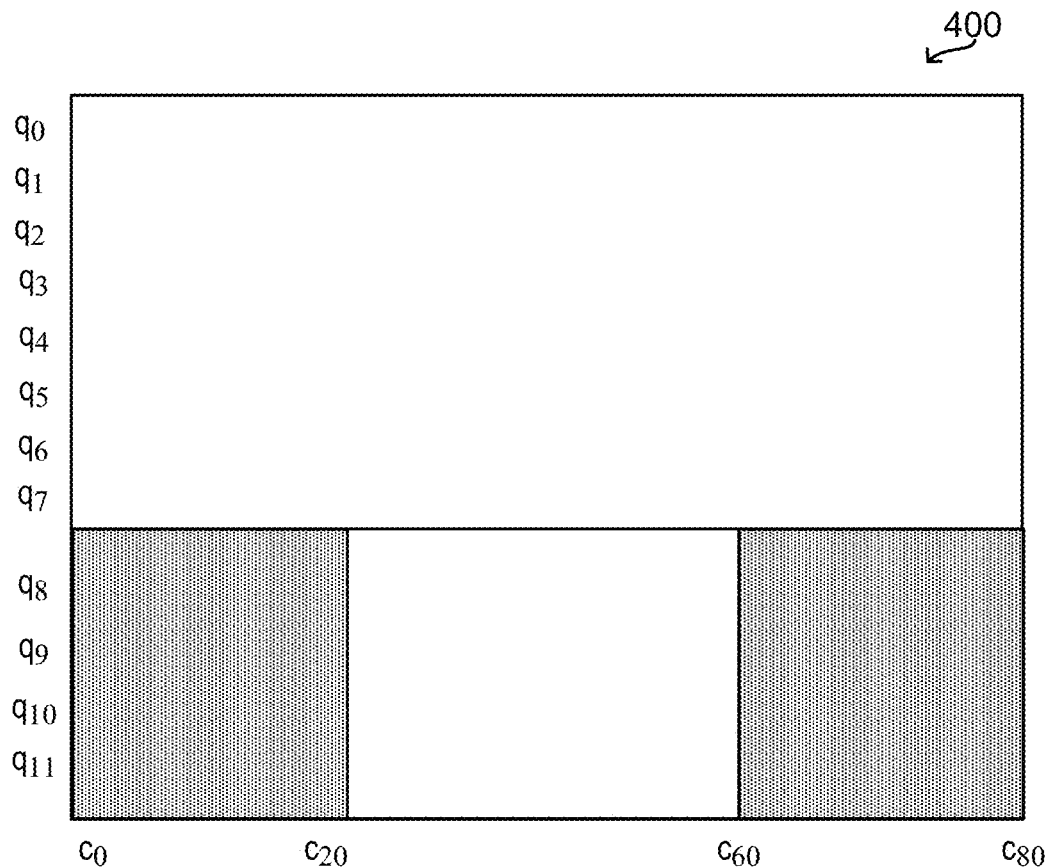
FIG. 4 shows an exemplary quantum circuit, in accordance with some exemplary embodiments of the disclosed subject matter.

Referring now to FIG. 4, showing an exemplary quantum circuit, in accordance with some exemplary embodiments of the disclosed subject matter.

In some exemplary embodiments, an execution task may specify a quantum program. In some cases, in accordance with the naïve method, the quantum program may be compiled into a quantum circuit before packing, thereby generating a square Circuit 400. In some exemplary embodiments. Circuit 400 may comprise a program that utilizes input qubits and auxiliary qubits. For example, the program may utilize eight qubits, denoted $q_0$-$q_7$, as input qubits, and four qubits, denoted $q_8$-$q_{11}$, as auxiliary qubits. In some exemplary embodiments, qubits utilized by Circuit 400 may be 'locked' in the square implementation, even in case they are idle, thereby preventing other circuits or other portions of the same circuit to utilize the idle qubits. For example, the auxiliary qubits may not be utilized between cycles 20 and 60, denoted $c_{20}$-$c_{60}$.

In some cases, instead of generating a Circuit 400 that locks the auxiliary qubits between cycles 20 and 60, implementing the disclosed subject manner would separate the circuit to nodes and enable other programs to utilize the idle qubits. For example, instead of compiling the program to Circuit 400 before packing, the program may be transpiled to a DAG circuit with nodes, and $q_8$-$q_{11}$ may be released from a node after cycle 20 and be used for any other program. It is noted that $q_8$-$q_{11}$ after cycle 60 may be implemented by any other qubits, which may not necessarily be the same qubits that were utilized up to cycle 20, without affecting a functionality of the circuit. In some exemplary embodiments, since auxiliary qubits may be used as temporary workspace that is not part of a quantum function logic flow, it may not make a difference which qubits are allocated to implement each path of an auxiliary qubit. For example, implementing the disclosed subject manner may result with obtaining a quantum DAG such as quantum DAG 603 of FIG. 6, in which the auxiliary qubits are separated to different nodes, e.g., nodes 622 and 624, before and after the idle period.

Figure 5C:
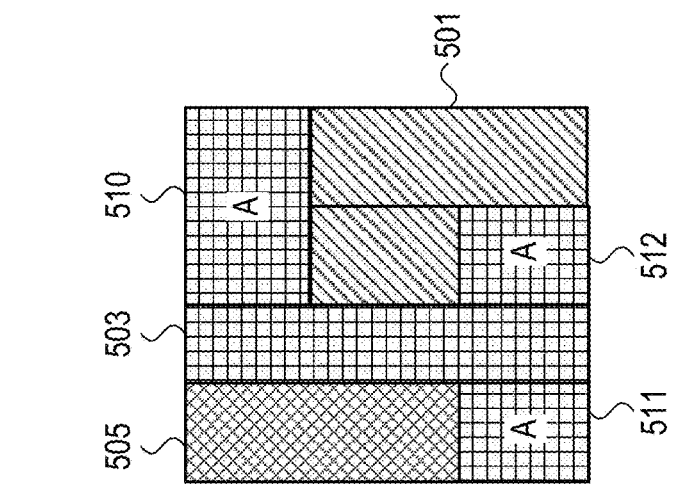
FIGS. 5A-5C illustrate exemplary packing scenarios, in accordance with some exemplary embodiments of the disclosed subject matter.
Figure 5B:
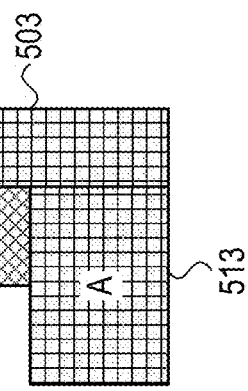
Figure 5A:
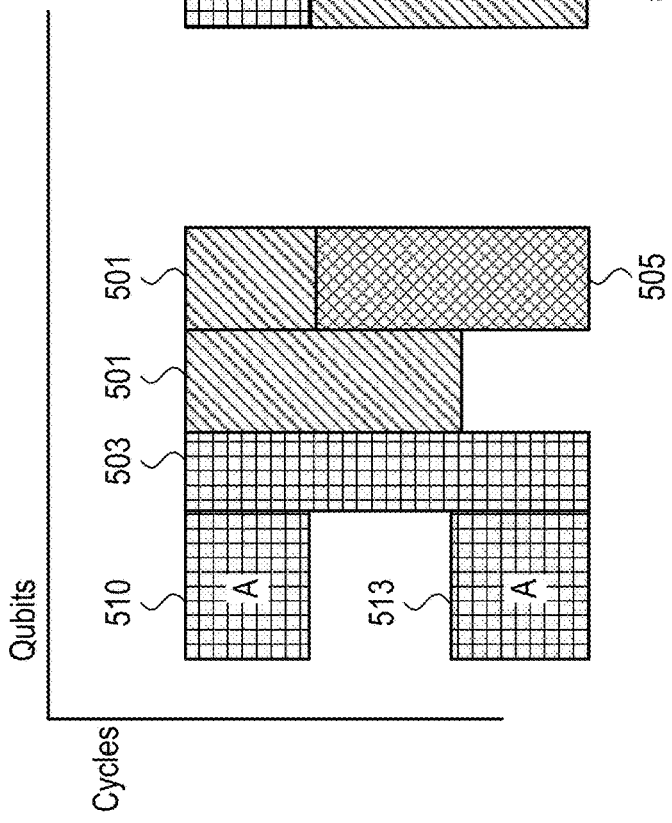

Referring now to FIGS. 5A-5C, illustrating exemplary packing scenarios, in accordance with some exemplary embodiments of the disclosed subject matter.

In some exemplary embodiments, an execution task may comprise one or more instances of Program 501, one or more instances of Program 503, and one or more instances of Program 505, each of which being depicted with a respective pattern. In some exemplary embodiments. Program 503 may utilize one or more auxiliary qubits such as Auxiliary Qubits 510 and 513.

FIG. 5A may depict a first way of packing the programs, in which Program 505 and Program 501 utilize the same qubits at different cycles. The packing of FIG. 5A may be suboptimal, since the qubits utilized to implement Auxiliary Qubits 510 may be idle during a number of cycles until Auxiliary Qubits 513, and since the qubits used for Program

501 may be idle during the last cycles. Idle periods may be identified by an empty space.

FIG. 5B may depict a second way of packing the programs, which may attempt to remedy the drawbacks of the packing of FIG. 5A. The packing of FIG. 5B comprises causing Programs 501 and 505 to utilize the same qubits as Auxiliary Qubits 510 at different cycles, and elongating Program 503, thereby utilizing less qubits and more cycles compared to the joint circuit of FIG. 5A. The packing of FIG. 5B may be suboptimal, at least since the qubits utilized to implement Program 503 may be idle during Period 520, since some of the qubits used to implement Program 501 may be idle thereafter, and since the greater number of cycles may reduce the quality of the result, such as by increasing an error rate. For example, an increased accumulation of errors may be caused by adding cycles.

FIG. 5C may depict a third way of packing the programs, which may remedy the drawbacks of the packing of FIGS. 5A and 5B. The packing of FIG. 5C comprises separating Auxiliary Qubits 513 to Auxiliary Qubits 512 and 511, where Auxiliary Qubits 511 is implemented by different qubits than the qubits utilized to implement Auxiliary Qubits 510. In some exemplary embodiments, auxiliary qubits may not be required to be implemented by the same qubits, thereby enabling a packing agent to implement auxiliary qubits in separate areas, such as in in convenient empty spaces that remain in the circuit.

In case each program would be compiled prior to the packing, the packing of FIG. 5C may not be enabled. For example, Program 503 may be compiled to Circuit 400 (FIG. 4), which may comprise a square circuit in which Auxiliary Qubits 513 cannot be split. According to the disclosed subject matter, instead of compiling each program prior to the packing, each program may be converted to a quantum DAG, e.g., in accordance with FIG. 6.

Figure 6:
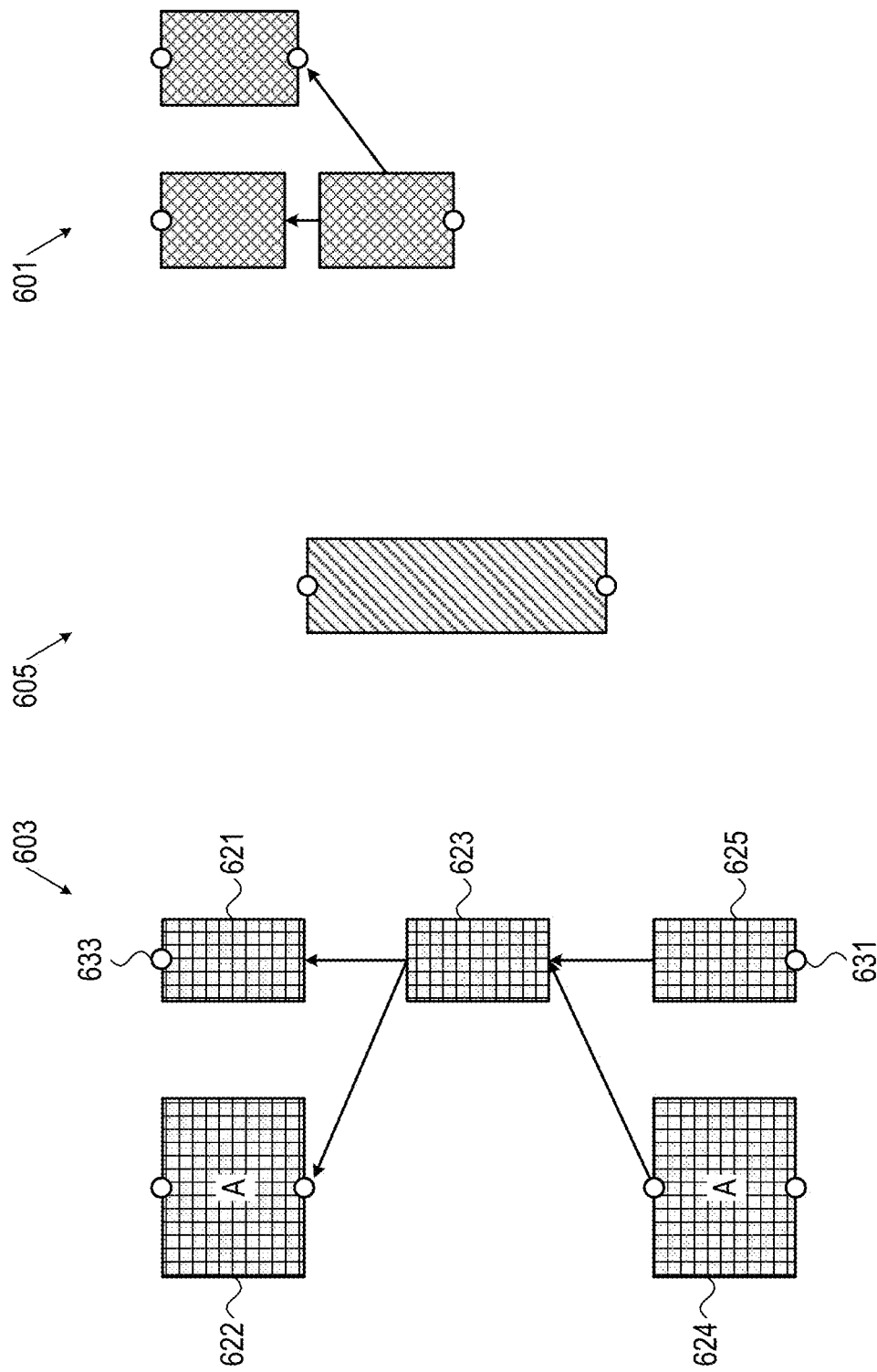
FIG. 6 shows exemplary quantum graphs, in accordance with some exemplary embodiments of the disclosed subject matter.

Referring now to FIG. 6, showing exemplary quantum DAGs, in accordance with some exemplary embodiments of the disclosed subject matter.

In some exemplary embodiments, an execution task may comprise multiple programs that need to be packed for a quantum computer. In some exemplary embodiments, a transpiler may convert the programs, or various implementations thereof, into respective quantum DAGs. For example, the execution task may comprise Programs 501, 503, and 505 (FIG. 5), which may be converted to quantum DAGs 601, 603, and 605, respectively. In some exemplary embodiments, as depicted in FIG. 6, each quantum DAG may be generated to comprise nodes that are connected with edges. In some exemplary embodiments, the nodes may comprise gate-level implementations of functional blocks of a program, while the edges may comprise qubits that are provided from an output of a first node to an input of a second node.

In some exemplary embodiments, the quantum DAGs may be generated to mark or indicate one or more quantum restrictions of the program, e.g., visually. In some exemplary embodiments, a marking may be used to mark an assignment of resources such as qubits to a task (e.g., a program), a release of the resources, or the like. For example, Visual Mark 631 may indicate that qubit resources are acquired or assigned to Node 625, which includes a functional block of quantum DAG 603. Visual Mark 633 may indicate that the qubit resources are released at Node 621. According to this example, qubits that are utilized by Node 623 may not be assigned to other tasks, at least since they are assigned to Node 625 and were not released.

In some exemplary embodiments, an exception to this rule may include dirty auxiliary qubits (not depicted). In some exemplary embodiments, dirty auxiliary qubits may be enabled to utilize qubits that are assigned to a task, including auxiliary qubits or non-auxiliary qubits. In some exemplary embodiments, paths of dirty auxiliary qubits may be marked (not depicted), indicating that they can be implemented by any other idle qubits, and thus be moved to any other position in the circuit. In some cases, resources that are released by a node may be indicated, or visually marked, as clean or dirty (not depicted).

In some exemplary embodiments, clean auxiliary qubits may be assigned a separate node than non-auxiliary qubits. For example, Node 624 may comprise clean auxiliary qubits that are utilized together with Node 625, and Node 622 may be utilized together with Node 621. Nodes 624 and 622 may each release their clean auxiliary qubits after the node, thus enabling any other node to utilize the qubits that are released. For example, the resources that are released from Node 624 may be added to an auxiliary qubit pool and utilized for any other program node. Nodes 624 and 622 may or may not utilize the same physical qubits. For example, since there may not be a difference between clean auxiliary qubits that are implemented by different qubits, Node 624 may be implemented by a first set of qubits, while Node 622 may be implemented by a different set of qubits, which may or may not have overlapping qubits as Node 624. Eliminating the dependency between Nodes 624 and 622 may increase a flexibility of packing the DAGs, and enable to obtain the packing of FIG. 5C.

Figure 7:
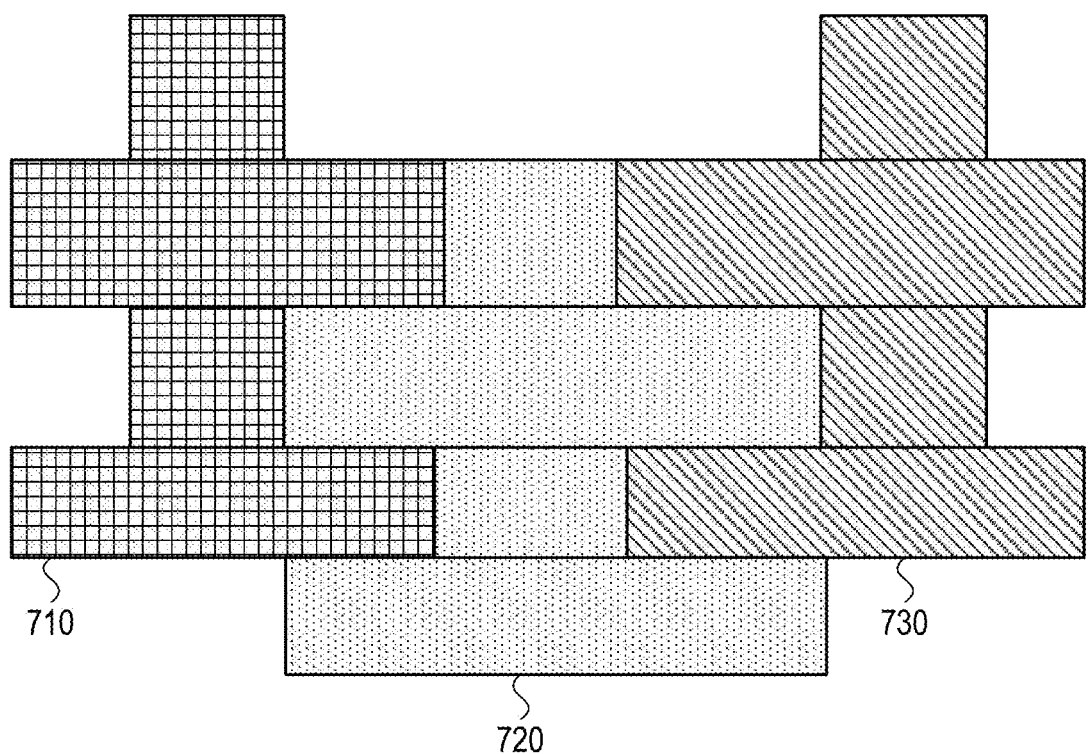
FIG. 7 shows an exemplary packing evaluation, in accordance with some exemplary embodiments of the disclosed subject matter.

Referring now to FIG. 7, showing an exemplary packing evaluation, in accordance with some exemplary embodiments of the disclosed subject matter.

In some exemplary embodiments, a packing of an execution task may be evaluated in one or more manners. For example, a transpiler may generate circuits, quantum DAGs, or the like, and a joint circuit may be created by packing the circuits together. In some exemplary embodiments, some packings may be more efficient than others, such as in case they cannot be packed or compressed any further. For example, FIG. 7 depicts an efficient packing of Programs 710, 720, and 730, that cannot be compressed any further.

In some exemplary embodiments, an evaluator may be configured to evaluate whether a packed circuit can be packed any further, e.g., based on whether or not locked paths therein are a local optimum. In some exemplary embodiments, a packing of a locked path of an auxiliary qubit may be determined to be locally optimal (e.g., indicating an efficient packing), in case at least one of the following conditions are met:

in case moving B to a later cycle, requires F or B or E to be moved to a later cycle as well.

in case moving B and F cannot be moved to an earlier cycle, without causing a different B, F, or E to be moved to a later cycle.

wherein B represents a start of a locked path of an auxiliary qubit, F may represent an end of a locked path of an auxiliary qubit, and E may represent a time of measuring the auxiliary qubit. In some exemplary embodiments, a locally optimal locked path that complies with both conditions, with one of the conditions, or the like, may comprise a path that cannot be packed any further. In such cases, a start of the packed locked path cannot be delayed, or moved to an earlier cycle without adversely affecting the functionality of the joint circuit, violating program constraints, or the like.

In some exemplary embodiments, in order to be evaluated as efficient, an objective function may be defined to measure the number or percentage of locked paths that are a local optimum. In some exemplary embodiments, a packing scheme may utilize the objective function in order to minimize lengths of locked paths, assign different qubits to different paths of an auxiliary qubit, or the like. In some exemplary embodiments, in case an auxiliary qubit of a program is used twice, during two separate ranges of cycles that are not attached, adjacent, or the like, the auxiliary qubit may have two separate locked paths, one for each usage. Each locked path may or may not be assigned to different physical qubits, such as according to a need of the execution task. In some exemplary embodiments, a packing scheme may position quantum gates, associated nodes, or the like, to earliest cycles as possible, without positioning them into occupied locked paths of auxiliary qubits. For example, in case a node utilizes, as an input, qubits from cycles 11 and 13, the node may be placed adjacently thereto at the nearest available position, e.g., at cycle 14.

Figure 8:
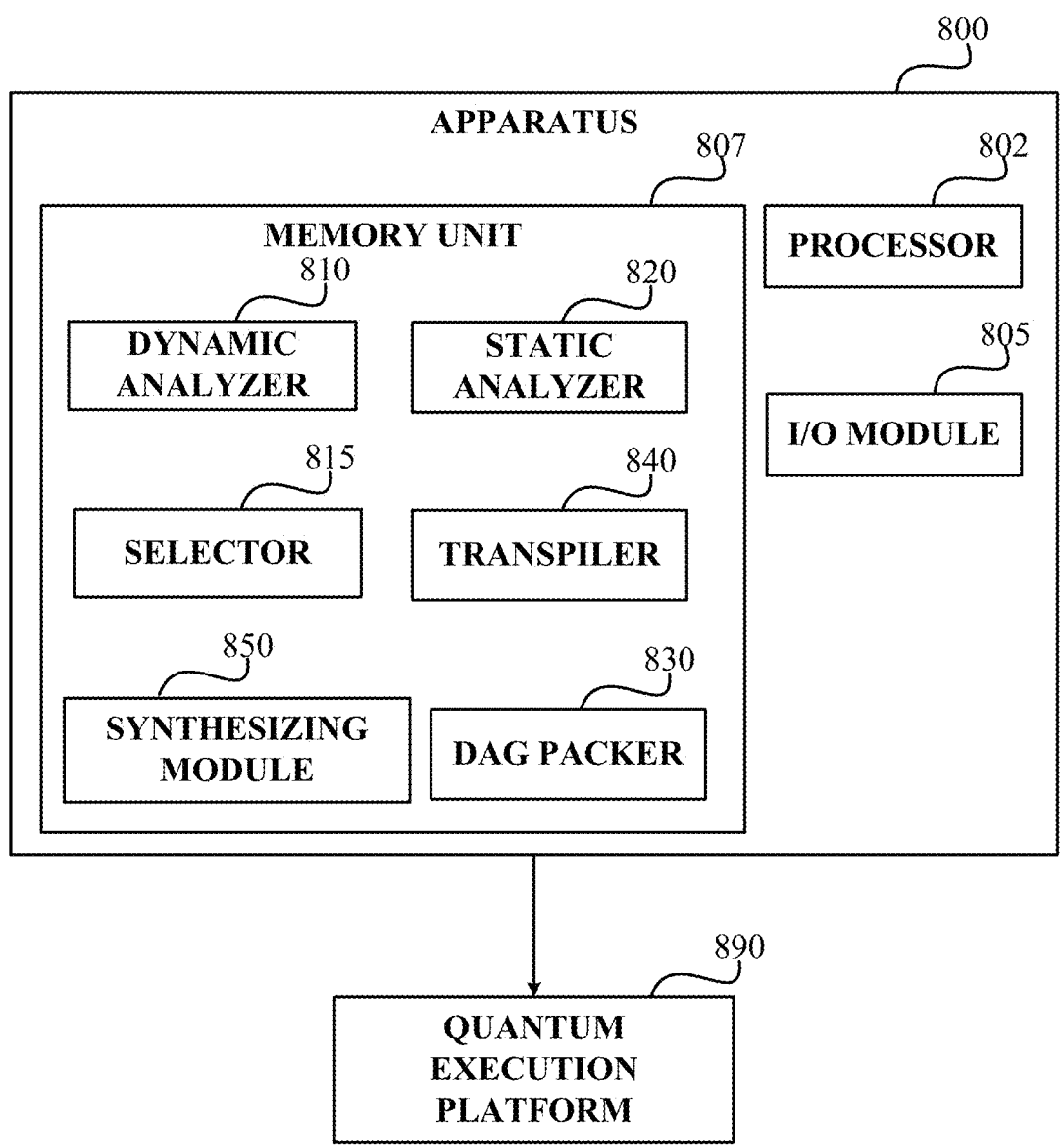
FIG. 8 shows an exemplary block diagram of an apparatus, in accordance with some exemplary embodiments of the disclosed subject matter.

Referring now to FIG. 8 showing a block diagram of an apparatus, in accordance with some exemplary embodiments of the disclosed subject matter.

In some exemplary embodiments, Apparatus 800 may comprise one or more Processor(s) 802. Processor 802 may be a Central Processing Unit (CPU), a microprocessor, an electronic circuit, an Integrated Circuit (IC) or the like. Processor 802 may be utilized to perform computations required by Apparatus 800 or any of its subcomponents. It is noted that Processor 802 may be a traditional classical processor, and not necessarily a quantum processor.

In some exemplary embodiments of the disclosed subject matter, Apparatus 800 may comprise an Input/Output (I/O) module 805. I/O Module 805 may be utilized to provide an output to and receive input from a user, an apparatus, or the like, such as, for example to obtain a user-defined objective function, to obtain an execution task, communicating with quantum hardware, obtaining an evaluator, obtaining a scheduler, obtaining a transpiler, or the like.

In some exemplary embodiments, Apparatus 800 may comprise Memory 807. Memory 807 may be a hard disk drive, a Flash disk, a Random Access Memory (RAM), a memory chip, or the like. In some exemplary embodiments, Memory 807 may retain program code operative to cause Processor 802 to perform acts associated with any of the subcomponents of Apparatus 800. Memory 807 may comprise one or more components as detailed below, implemented as executables, libraries, static libraries, functions, or any other executable components.

In some exemplary embodiments, Memory 807 may comprise one or more components, such as Selector 815, that are configured to select a cloud computer for an execution task. For example, a Dynamic Analyzer 810 and a Static Analyzer 820 may be configured to analyze execution pairs, each including the execution task and a different execution platform. For example, according to Step 130 of FIG. 1, Dynamic Analyzer 810 may perform a dynamic analysis of one or more execution pairs, while Static Analyzer 820 may perform a static analysis of one or more execution pairs. In some exemplary embodiments, Dynamic Analyzer 810 and a Static Analyzer 820 may be configured to measure performance parameters of execution pairs. Selector 815 may score estimated costs of the measured performance parameters, weigh the costs according to an objective function of a user, and select a best scoring cloud computer such as Quantum Execution Platform 890 for executing the task.

In some exemplary embodiments, Memory 807 may comprise one or more components, such as DAG Packer 830, that are configured to pack programs for a specific quantum computer such as Quantum Execution Platform 890. In some exemplary embodiments, Memory 807 may comprise a Transpiler 840 that may be configured to obtain a representation of an execution task, including multiple quantum programs, and convert the programs to quantum DAGs. For example, Transpiler 840 may obtain one or more alternative implementations for each program, and convert the implementation to a corresponding quantum DAG. Transpiler 840 may generate the quantum DAGs to comprise one or more markings or indications of quantum restrictions such as when resources are released, at what state they are released, or the like.

In some exemplary embodiments, DAG Packer 830 may obtain the quantum DAGs from Transpiler 840, and pack them using a job shop scheduler, a CSP solver, or the like, without violating the quantum restrictions. The quantum restrictions of the quantum DAGs may be expressed, in some cases, with a classical language of a classical computer. In some exemplary embodiments, DAG Packer 830 may pack the quantum DAGs according to one or more objective function, cost functions, or the like, which may measure non-effective portions of the circuit, locked paths that are locally optimum, or the like. For example, the packing may correspond to Step 340 of FIG. 3. After packing the quantum DAGs, a Synthesizing Module 850 may synthesize the packed circuit, and Quantum Execution Platform 890 may be utilized to execute or simulate the synthesized circuit.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
    obtaining an indication of an execution task, the execution task comprises executing a quantum program a number of times, the number of times is larger than two times; and
    selecting a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises:
  compiling the quantum program or a portion thereof to a first executable quantum circuit, the first executable quantum circuit complying with hardware constraints of the first quantum computer;
  based on the first executable quantum circuit, estimating the first value of the performance parameter that is associated with the first quantum computer, wherein said estimating is performed statically without executing the first executable quantum circuit;
  compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and
  based on said the second executable quantum circuit, estimating the second value of the performance parameter that is associated with the second quantum computer, wherein said estimating is performed statically without executing the second executable quantum circuit.

2. The method of claim 1, wherein said selecting is further based on a dynamic analysis of the set of two or more quantum computers, wherein the dynamic analysis comprises:
  performing, by the first quantum computer, an execution of the first executable quantum circuit for a second number of times;
  based on said performing the execution of the first executable quantum circuit for the second number of times, estimating the first value of the performance parameter;
  performing, by the second quantum computer, an execution of the second executable quantum circuit for a third number of times, wherein a summation of the second number of times and of the third number of times is lesser than the number of times; and
  based on said performing the execution of the second executable quantum circuit, estimating the second value of the performance parameter.

3. The method of claim 2, wherein said selecting the quantum computer for performing the execution task comprising:
  using a static analysis for measuring first and second value ranges of the performance parameter;
  using a cost function to determine first and second cost ranges corresponding to the first and second value ranges of the performance parameter;
  determining that a comparison of the first and second cost ranges results with an indefinite outcome; and
  in response to said determining that the comparison of the first and second cost ranges results with the indefinite outcome, performing a dynamic analysis for obtaining a definite outcome to the comparison, wherein the dynamic analysis comprises performing: said performing the execution of the first executable quantum circuit for the second number of times, and said performing the execution of the second executable quantum circuit for the third number of times, wherein the first and second values of the performance parameter are first and second discrete values of the performance parameter, whereby based on the dynamic analysis a definite outcome to a comparison between the first and second quantum computers is obtainable.

4. The method of claim 1, wherein the set of two or more quantum computers comprises a third quantum computer, said selecting is based on a third value of the performance parameter that is associated with the third quantum computer, wherein a static analysis is configured to estimate the third value without compiling of the quantum program or the portion thereof to a third executable quantum circuit complying with hardware constraints of the third quantum computer.

5. The method of claim 1, wherein said compiling the quantum program to the first executable quantum circuit comprises:
  obtaining a minor program that shares one or more attributes with the quantum program, wherein the minor program is estimated to utilize less quantum resources, when executed on the quantum computer, than the quantum program; and
  compiling the minor program to obtain the first executable quantum circuit.

6. The method of claim 1, wherein said obtaining the minor program comprises obtaining a sample program configured to provide a subset of functionalities defined by the quantum program.

7. The method of claim 1, wherein the hardware constraints of the first quantum computer comprise at least one constraint of a type of: a constraint on a number of qubits; a constraint on a number of gates of one or more types; a constraint on a number of cycles; a constraint on a ratio between the number of qubits and the number of cycles.

8. The method of claim 1, wherein the hardware constraints of the first quantum computer include a constraint of a first type, wherein the hardware constraints of the second quantum computer exclude the constraint of the first type.

9. The method of claim 1 further comprises obtaining an indication of the hardware constraints of the first and second quantum computers.

10. The method of claim 1, wherein the set of two or more quantum computers comprises a third quantum computer, wherein said selecting the quantum computer from the set of two or more quantum computers comprises:
  detecting that the third quantum computer has resources which are not compliant with required resources of the execution task; and
  avoiding selecting the third quantum computer, whereby avoiding compiling and executing the quantum program or the portion thereof with respect to the third quantum computer.

11. The method of claim 1, wherein said selecting comprises:
  computing a first score for the first quantum computer based on an objective function and based on the first value of the performance parameter;
  computing a second score for the second quantum computer based on the objective function and based on the second value of the performance parameter; and
  whereby selection of the quantum computer is based on the first and second scores.

12. The method of claim 11, wherein said selecting is performed based on a first value of a second performance parameter that is associated with the first quantum computer and based on a second value of the second performance parameter that is associated with the second quantum computer, wherein the objective function provides respective weights for the performance parameter and for the second performance parameter.

13. The method of claim 1 further comprising completing the execution task using the quantum computer, said completing comprises: performing, by the quantum computer, a fourth number of times an execution of the quantum program, wherein the fourth number of times is equal to: $N_1-(N_2+N_3)$, wherein $N_1$ is the first number of times, $N_2$ is the second number of times and $N_3$ is the third number of times, whereby implementing the execution task while utilizing executions that were performed as part of said selecting.

14. The method of claim 1, wherein the first value of the performance parameter indicated a first packing capability of the execution task at the first quantum computer, and the second value of the performance parameter indicated a second packing capability of the execution task at the second quantum computer.

15. The method of claim 1, wherein the performance parameter comprises at least one of:
  a compliance parameter;
  a parallel execution parameter;
  a connectivity parameter;
  an execution-effectiveness parameter;
  an execution-time parameter;
  an error-rate parameter; and
  an entanglement parameter.

16. The method of claim 1, wherein the execution task further comprises executing a second quantum program for a fourth number of times.

17. An apparatus comprising a processor and coupled memory, said processor being adapted to:
  obtain an indication of an execution task, the execution task comprises executing a quantum program a number of times, the number of times is larger than two times; and
  select a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises:
    compiling the quantum program or a portion thereof to a first executable quantum circuit, the first executable quantum circuit complying with hardware constraints of the first quantum computer;
    based on the first executable quantum circuit, estimating the first value of the performance parameter that is associated with the first quantum computer, wherein said estimating is performed statically without executing the first executable quantum circuit;
    compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and
    based on said the second executable quantum circuit, estimating the second value of the performance parameter that is associated with the second quantum computer, wherein said estimating is performed statically without executing the second executable quantum circuit.

18. The apparatus of claim 17, wherein said selecting is further based on a dynamic analysis of the set of two or more quantum computers, wherein the dynamic analysis comprises:
  performing, by the first quantum computer, an execution of the first executable quantum circuit for a second number of times;
  based on said performing the execution of the first executable quantum circuit for the second number of times, estimating the first value of the performance parameter;
  performing, by the second quantum computer, an execution of the second executable quantum circuit for a third number of times, wherein a summation of the second number of times and of the third number of times is lesser than the number of times; and
  based on said performing the execution of the second executable quantum circuit, estimating the second value of the performance parameter.

19. The apparatus of claim 18, wherein said selecting the quantum computer for performing the execution task comprising:
  using a static analysis for measuring first and second value ranges of the performance parameter;
  using a cost function to determine first and second cost ranges corresponding to the first and second value ranges of the performance parameter;
  determining that a comparison of the first and second cost ranges results with an indefinite outcome; and
  in response to said determining that the comparison of the first and second cost ranges results with the indefinite outcome, performing a dynamic analysis for obtaining a definite outcome to the comparison, wherein the dynamic analysis comprises performing; said performing the execution of the first executable quantum circuit for the second number of times, and said performing the execution of the second executable quantum circuit for the third number of times, wherein the first and second values of the performance parameter are first and second discrete values of the performance parameter, whereby based on the dynamic analysis a definite outcome to a comparison between the first and second quantum computers is obtainable.

20. A computer program product comprising a non-transitory computer readable medium retaining program instructions, which program instructions when read by a processor, cause the processor to:
  obtain an indication of an execution task, the execution task comprises executing a quantum program a number of times, the number of times is larger than two times; and
  select a quantum computer from a set of two or more quantum computers for performing the execution task, the set of two or more quantum computers comprise a first quantum computer and a second quantum computer, said selecting the quantum computer is performed based on a first value of a performance parameter that is associated with the first quantum computer and based on a second value of the performance parameter that is associated with the second quantum computer, said selecting the quantum computer comprises:
    compiling the quantum program or a portion thereof to a first executable quantum circuit, the first executable quantum circuit complying with hardware constraints of the first quantum computer;

based on the first executable quantum circuit, estimating the first value of the performance parameter that is associated with the first quantum computer, wherein said estimating is performed statically without executing the first executable quantum circuit;

compiling the quantum program or the portion thereof to a second executable quantum circuit, the second executable quantum circuit complying with hardware constraints of the second quantum computer, wherein the first executable quantum circuit and the second executable quantum circuit are different implementations of the quantum program or portion thereof; and based on said the second executable quantum circuit, estimating the second value of the performance parameter that is associated with the second quantum computer, wherein said estimating is performed statically without executing the second executable quantum circuit.

* * * * *